US008175178B2

(12) United States Patent
Moffatt et al.

(10) Patent No.: US 8,175,178 B2
(45) Date of Patent: *May 8, 2012

(54) ORTHOGONAL FREQUENCY DIVISION MULTIPLEXING (OFDM) COMMUNICATIONS DEVICE AND METHOD THAT INCORPORATES LOW PAPR PREAMBLE AND VARIABLE NUMBER OF OFDM SUBCARRIERS

(75) Inventors: Christopher D. Moffatt, Palm Bay, FL (US); John E. Hoffmann, Indialantic, FL (US)

(73) Assignee: Harris Corporation, Melbourne, FL (US)

( * ) Notice: Subject to any disclaimer, the term of this patent is extended or adjusted under 35 U.S.C. 154(b) by 852 days.

This patent is subject to a terminal disclaimer.

(21) Appl. No.: 12/242,958

(22) Filed: Oct. 1, 2008

(65) Prior Publication Data

US 2010/0080310 A1 Apr. 1, 2010

(51) Int. Cl.
*H04K 1/10* (2006.01)
*H04L 27/00* (2006.01)
(52) U.S. Cl. ........................................ 375/260; 375/259
(58) Field of Classification Search .................. 375/260, 375/259
See application file for complete search history.

(56) References Cited

U.S. PATENT DOCUMENTS

| 7,280,804 | B2 | 10/2007 | Jacobsen et al. | 455/67.11 |
| 7,289,588 | B2 | 10/2007 | Suh et al. | 375/367 |
| 2004/0136464 | A1 | 7/2004 | Suh et al. | 375/260 |
| 2005/0036481 | A1 | 2/2005 | Chayat et al. | 370/351 |
| 2006/0050799 | A1* | 3/2006 | Hou et al. | 375/260 |
| 2006/0245472 | A1 | 11/2006 | Pan et al. | 375/144 |
| 2007/0054681 | A1* | 3/2007 | Suh et al. | 455/502 |
| 2007/0058693 | A1* | 3/2007 | Aytur et al. | 375/130 |
| 2008/0039107 | A1 | 2/2008 | Ma et al. | 455/450 |
| 2008/0080630 | A1 | 4/2008 | Sung | 375/260 |
| 2009/0073870 | A1* | 3/2009 | Haartsen et al. | 370/216 |

FOREIGN PATENT DOCUMENTS

WO 2006/034577 6/2006

OTHER PUBLICATIONS

Gimlin et al., "*On Minimizing the Peak-to-Average Power Ratio for the Sum of N Sinusoids*," IEEE Transactions on Communications, vol. 41, No. 4, Apr. 1993, pp. 631-635.
Boyd, "*Multitone Signals with Low Crest Factor*,"IEEE Transactions on Circuits and Systems, vol. CAS-33, No. 10, Oct. 1986, pp. 1018-1022.
Friese, "*Multitone Signals with Low Crest Factor*," IEEE Transactions on Communications, vol. 45, No. 10, Oct. 1997, pp. 1338-1344.
Tellambura et al., "*Optimal Sequences for Channel Estimation Using Discrete Fourier Transform Techniques*," IEEE Transactions on Communications, vol. 47, No. 2, Feb. 1999, pp. 230-238.

* cited by examiner

*Primary Examiner* — David C. Payne
*Assistant Examiner* — Brian J Stevens
(74) *Attorney, Agent, or Firm* — Allen, Dyer, Doppelt, Milbrath & Gilchrist, P.A.

(57) ABSTRACT

A communications device includes communications data and a training sequence corresponding to a preamble. A modulation and mapping circuit modulates the communications data and training sequence into a plurality of multiple subcarriers that are orthogonal to each other to form an OFDM communication signal having modulated subcarriers carrying the communications data forming a data payload and modulated subcarriers forming the preamble. A circuit turns OFF and ON selected subcarriers based on an encryption algorithm to increase transmit power and signal-to-noise ratio and reduce the Inter-Carrier Interference (ICI). The modulation and mapping circuit applies a quadratic modulation to the subcarriers carrying the training sequences to produce a low peak-to-average power ratio (PAPR) preamble with a PAPR value of approximately 2.6 decibels (dB).

26 Claims, 23 Drawing Sheets

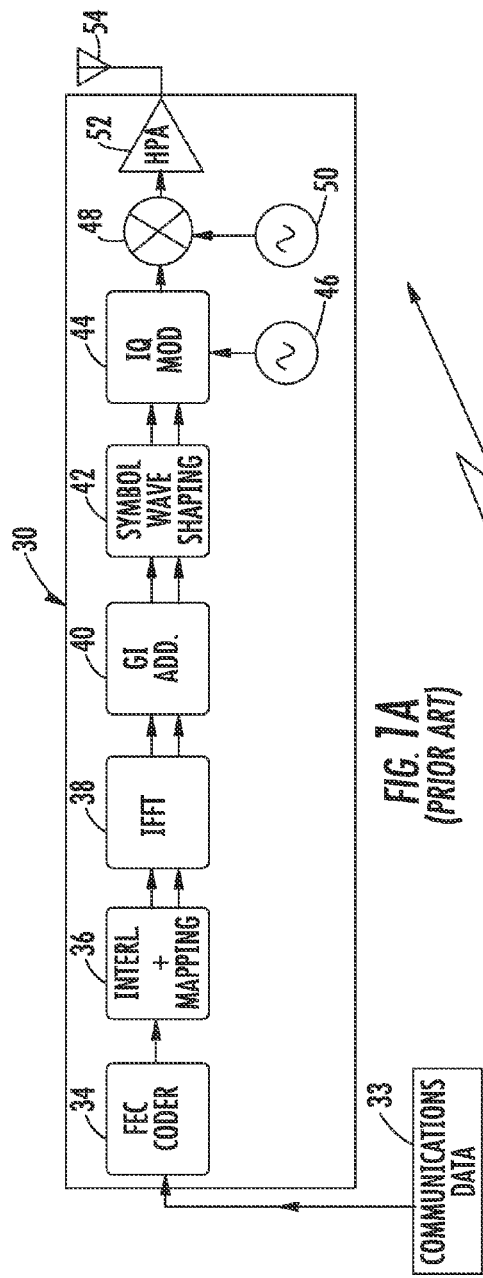
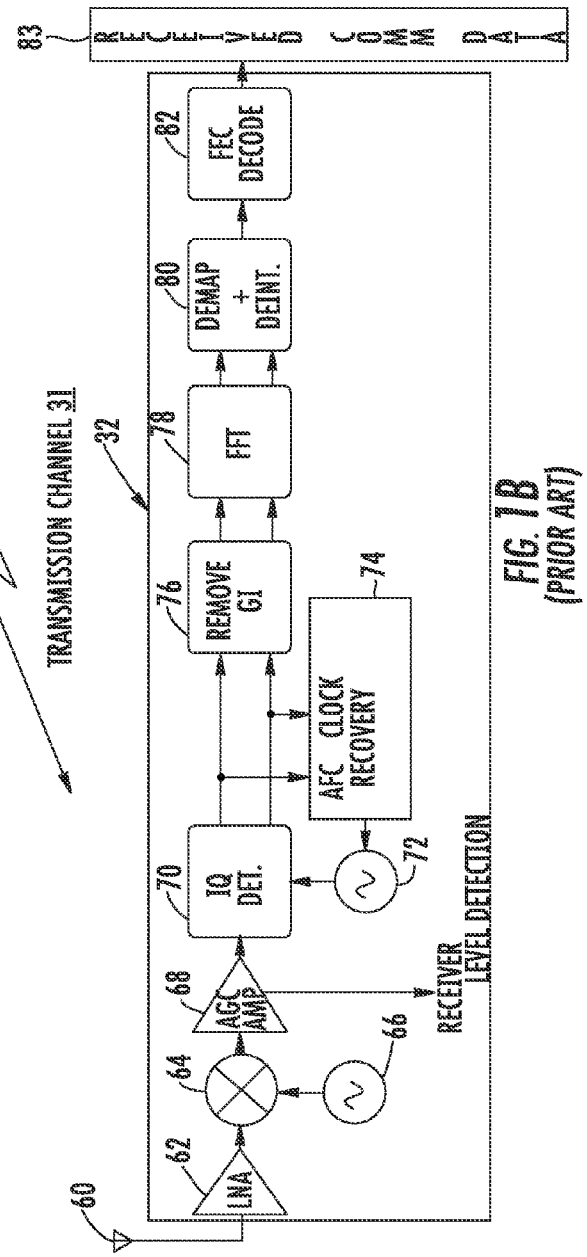
FIG. 1A (PRIOR ART)
FIG. 1B (PRIOR ART)

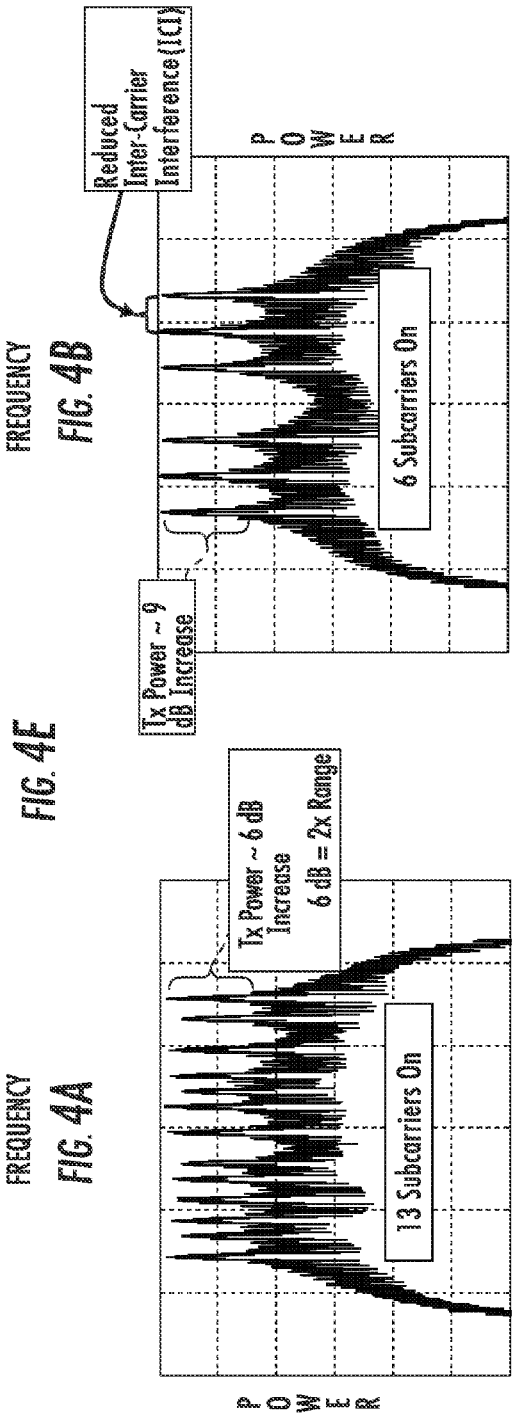
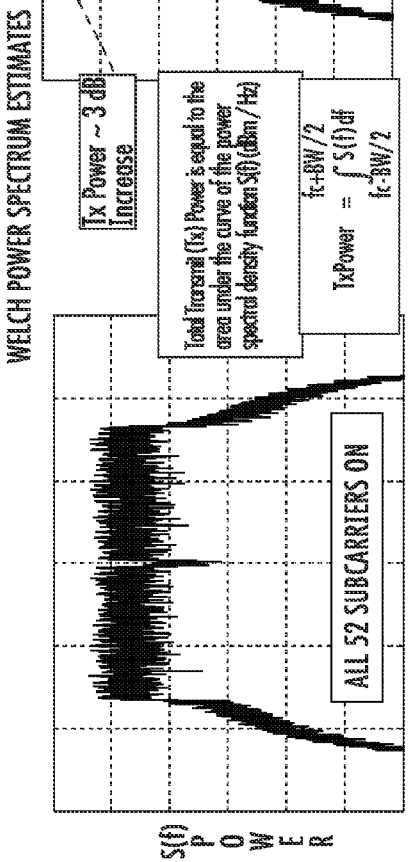

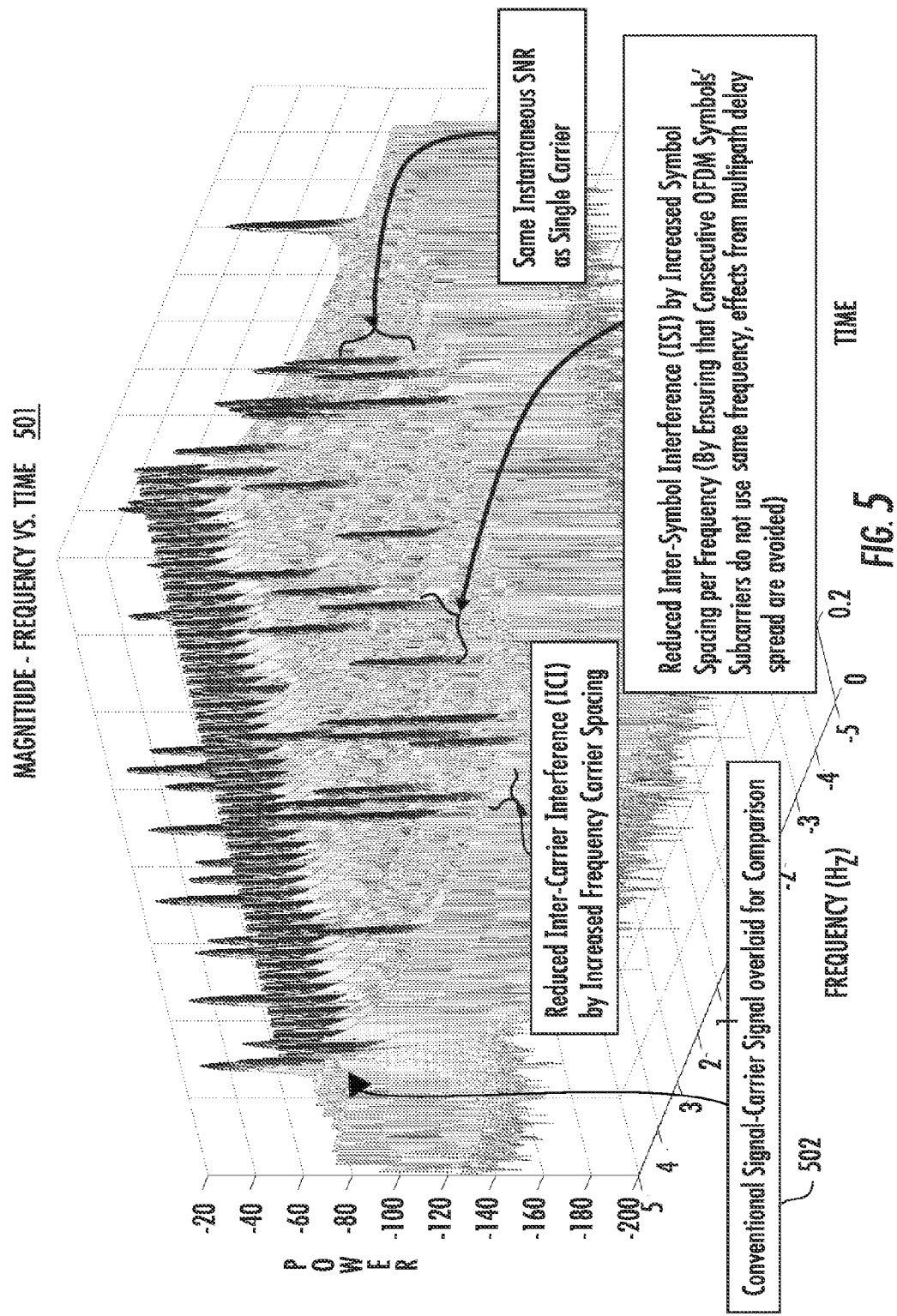

ORTHOGONAL FREQUENCY DIVISION MULTIPLEXING (OFDM) COMMUNICATIONS DEVICE AND METHOD THAT INCORPORATES LOW PAPR PREAMBLE AND VARIABLE NUMBER OF OFDM SUBCARRIERS

FIELD OF THE INVENTION

The present invention relates to communications systems, and more particularly, this invention relates to multiple carrier communication systems, including but not limited to, Orthogonal Frequency Division Multiplexing (OFDM) communications systems.

BACKGROUND OF THE INVENTION

In OFDM communications systems the frequencies and modulation of a frequency-division multiplexing (FDM) communications signal are arranged orthogonal with each other to eliminate interference between signals on each frequency. In this system, low-rate modulations with relatively long symbols compared to the channel time characteristics are less sensitive to multipath propagation issues. OFDM thus transmits a number of low symbol-rate data streams on separate narrow frequency subbands using multiple frequencies simultaneously instead of transmitting a single, high symbol-rate data stream on one wide frequency band on a single frequency. These multiple subbands have the advantage that the channel propagation effects are generally more constant over a given subband than over the entire channel as a whole. A classical In-phase/Quadrature (I/Q) modulation can be transmitted over individual subbands. Also, OFDM is typically used in conjunction with a Forward Error Correction scheme, which in this instance, is sometimes termed Coded Orthogonal FDM or COFDM.

As known to those skilled in the art, an OFDM signal can be considered the sum of a number of orthogonal subcarrier signals, with baseband data on each individual subcarrier independently modulated, for example, by Quadrature Amplitude Modulation (QAM) or Phase-Shift Keying (PSK). This baseband signal can also modulate a main RF carrier.

These types of multi-carrier waveforms for digital communications require a summation of multiple frequency-spaced single-carriers prior to transmission through a Power Amplifier (PA). OFDM systems typically use a hardware efficient IFFT to modulate each individual subcarrier with a QAM symbol and sum the modulated complex exponentials together to produce a single time-domain waveform, which has a very large Peak-to-Average Power (PAPR) ratio. As a result, the average power into the PA must be "backed-off" to avoid clipping of the time-domain signal peaks. This clipping significantly increases the in-band noise (IBN) and the out-of-band noise (OBN) and adversely increases the Bit Error Rate (BER) and the Adjacent Channel Interference (ACI), respectively.

Terrestrial wireless communications systems usually encounter multipath fading channels, which are typically modeled using a Rician direct path and several additional Rayleigh paths. Most standard OFDM systems use a set of known training symbols to estimate the wireless channel's frequency response. These training symbols are transmitted during the beginning of a packet and form the preamble. Occasionally training symbols are transmitted during the middle of a packet and form a midamble. This preamble provides to the receiver known amplitude and phase references at each of the subcarrier frequencies. The preamble $X(f)$ is stored in memory and known in advance at the receiver. The transmitter sends $x(t)$ [the inverse Fourier Transform of $X(f)$] over the wireless channel to the receiver. During its transmission to the receiver, the transmitted preamble representation $x(t)$ is convolved with the channel's time response $h(t)$ to produce $y(t)$ at the receiver. The receiver uses $Y(f)$ [the Fourier transform of $y(t)$] to calculate $H(f)=Y(f)/X(f)$, the channel frequency response. In order to compensate for the channel response at the receiver, incoming data symbols are multiplied by $H^{-1}(f)$, which is equivalent to the convolution in the time-domain with the inverse channel response.

Conventional OFDM systems use a preamble designed for a specific number of subcarriers. Each preamble has a low PAPR by design. Optimizing a preamble's PAPR for a certain number of subcarriers N does not hold when the number of subcarriers changes. Therefore, if the number of subcarriers in the system changes, a new low PAPR preamble based on the changed (but fixed) number of subcarriers is required. Thus, current OFDM systems design and implement special preambles for each fixed number of subcarriers. Typically, OFDM implementations that allow a different number of subcarriers have a small number of combinations of subcarrier sizes and preambles to select from based on which fixed number of subcarriers will be transmitted. In practical OFDM systems, the PAPR may be reduced using one or a combination of several techniques.

Some OFDM systems use nonlinear signal distortion such as hard clipping, soft clipping, companding, or predistortion techniques. These nonlinear distortion techniques are implemented in fairly simple circuits. They do not work well, however, in cases where the OFDM subcarriers are modulated with higher order modulation schemes. In such situations, the Euclidian distance between the symbols is relatively small and the additional noise introduced by the PAPR reduction causes significant performance degradation.

A second group of OFDM systems reduce PAPR using various coding techniques, which are typically distortionless. The PAPR reduction is most commonly achieved by eliminating symbols having a large PAPR. To obtain an appreciable level of PAPR reduction, however, high redundancy codes are used and as a result, the overall transmission efficiency is reduced.

A third group of OFDM systems minimize PAPR based on OFDM symbol scrambling and selecting a sequence that produces minimum PAPR. These pre-scrambling techniques achieve good PAPR reduction, but typically require multiple FFT transforms and higher processing power. An example of OFDN systems using some type of scrambling are the OFDM communications systems and methods disclosed in commonly assigned U.S. patent application Ser. Nos. 11/464,877; 11/464,857; 11/464,854; 11/464,861; and 11/464,868, filed on Aug. 16, 2006, the disclosures which are hereby incorporated by reference in their entirety. Further enhancements to those systems are found in commonly assigned U.S. patent application Ser. Nos. 12/060,283; 12/060,311; and 12/060, 292, filed Apr. 1, 2008, the disclosures which are hereby incorporated by reference in their entirety.

An OFDM waveform has a very large Peak to Average Power Ratio (PAPR). To avoid clipping and nonlinear distortion, the OFDN transmitter's Power Amplifier (PA) needs to be operated a significantly lower power level than its peak rating (i.e., "backed off"). This paper proposes a novel low PAPR preamble for channel estimation. This solution yields a preamble with a typical PAPR of 2.6 dB, regardless of the number of subcarriers. The subcarriers are evenly spaced and equal amplitude, ideal for channel sounding. The result is a preamble construction that operates over a variable number of subcarriers, improves SNR, and is easy to implement. The theoretical basis for the technique is presented, and a particular implementation of the technique in hardware is discussed. Both simulations and measurements demonstrate very significant benefits of the technique in long-range wireless communications applications that use an OFDM waveform for radio communications.

SUMMARY OF THE INVENTION

A communications device includes communications data and a training sequence corresponding to a preamble. A modulation and mapping circuit modulates the communications data and training sequence into a plurality of multiple subcarriers that are orthogonal to each other to form an OFDM communication signal having modulated subcarriers carrying the communications data forming a data payload and modulated subcarriers forming the preamble. A circuit turns OFF and ON selected subcarriers based on an encryption algorithm to increase transmit power and signal-to-noise ratio per subcarrier and reduce the Intercarrier Interference (ICI). The modulation and mapping circuit applies a quadratic modulation to the subcarriers carrying the training sequences to produce a low peak-to-average power ratio (PAPR) preamble with about a PAPR value of 2.6 decibels (dB).

A circuit spreads the selected ON subcarriers over the frequency domain to reduce average power for enhanced Low Probability of Interception/Low Probability of Detection (LPI/LPD) and allows for more transmit power within a spectral mask and reduces adverse effects of Frequency Selected Fading. The pseudo-random signal generator is operative with the modulation and mapping circuit and generates pseudo-random signals based on an encryption algorithm for frequency hopping each subcarrier at an OFDM symbol rate. This low PAPR preamble can be independent of the number of subcarriers forming the OFDM communications signal.

The modulation and mapping circuit is also operative for setting quadratic phases of sinusoids forming the subcarriers carrying the training sequences and setting the phases to a specific angle. The preamble can include a long sync sequence for channel and fine frequency offset estimation having a guard interval (GI). The subcarriers that carry the training sequences can have an equal amplitude.

In yet another aspect, the guard interval is split from the long sync sequence and its inverse is processed into values that represent the low PAPR preamble as plus or minus one (±1) values in a real or imaginary component as adds and subtracts for channel estimation.

A method aspect is also set forth.

BRIEF DESCRIPTION OF THE DRAWINGS

Other objects, features, and advantages of the present invention will become apparent from the detailed description of the invention which follows, when considered in light of the accompanying drawings in which:

FIGS. 1A and 1B are prior art, high-level block diagrams showing respective transmitter and receiver circuits for an IEEE 802.11a OFDM modem connected through a radio transmission channel.

FIGS. 4A-4D are spectral density graphs with each graph showing an OFDM spectrum, with one graph showing 52 subcarriers ON, and comparing this graph with a graph of spectrum in which a respective 26 subcarriers are ON, another graph showing 13 subcarriers are ON, and another graph showing 6 subcarriers are ON, producing a reduced Inter-Carrier Interference (ICI), while FIG. 4E is an explanation and equation representing total transmit power from a spectral density function.

FIG. 5 is a graph showing a three-dimensional spectrogram (power vs. frequency vs. time) of Symbol-Based and Frequency Randomized subcarriers for a frequency hopping OFDM signal that could incorporate the low PAPR preamble in accordance with a non-limiting example of the present invention, and also showing a conventional single carrier signal overlaid for comparison.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In accordance with a non-limiting example, the low PAPR preamble provides greater transmit power during the preamble and provides for better channel equalization. The PAPR of the preamble is typically 2.6 dB regardless of the number of subcarriers. A greater signal-to-noise ratio can be allowed for channel equalization, allowing a lower bit error rate (BER). Typically, in OFDM systems, a higher signal-to-noise ratio is required for detection because of the robust turbo/LDPC (low-density parity-check) forward error correction (FEC) coding schemes as compared to data symbol decoding. The system and method provides for high signal-to-noise ratio for detection. It also permits a lower PAPR than most existing preamble techniques used with OFDM systems and provides good correlation properties for receiver detection. The low PAPR preamble is operable in OFDM systems having a variable number of subcarriers and can be implemented in efficient hardware implementation with IFFT/FFT circuits.

The low PAPR preamble, in accordance with a non-limiting example, requires less back-off from the power amplifier's P1 dB point, allowing higher transmit power. When subcarriers are evenly spaced at equal amplitude, the OFDM communications system incorporating the low PAPR preamble is ideal for channel sounding.

This use of the low PAPR preamble, in accordance with non-limiting aspects, is advantageous for both the commercial market and government market that demands higher data rates and increased spectral efficiency with better bandwidth use. This low PAPR preamble allows increased data rates and spectral efficiency for OFDM systems even when the number of subcarriers is increased. It overcomes the drawbacks typically associated with OFDM systems that use a large number of subcarriers that lead to high PAPR, create a demand for larger power amplifiers, and increase cost, size, weight and power of the associated devices. The system and method allows a reduced PAPR preamble, independent of the number of subcarriers, and provides optimal channel estimation and good correlation properties for receiver detection. It is easily implemented via an IFFT/FFT. The lower PAPR preamble allows increased transmit power using power amplifiers with lower cost, size, weight and power.

Figure 2A:
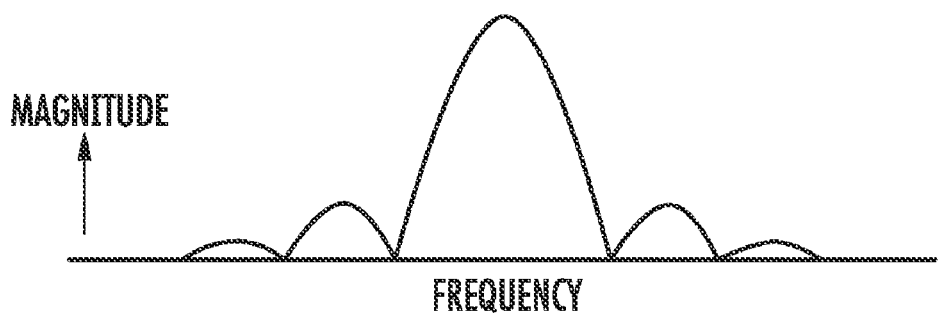
FIGS. 2A-2C are spectrum graphs representing a) a single carrier signal; b) a Frequency Division Multiplexing (FDM) signal; and c) an Orthogonal Frequency Division Multiplexing (OFDM) signal.
Figure 2B:
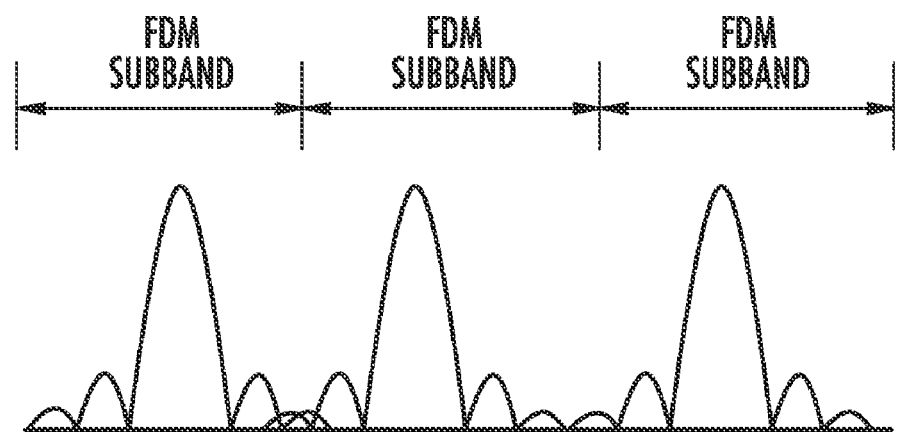
Figure 2C:
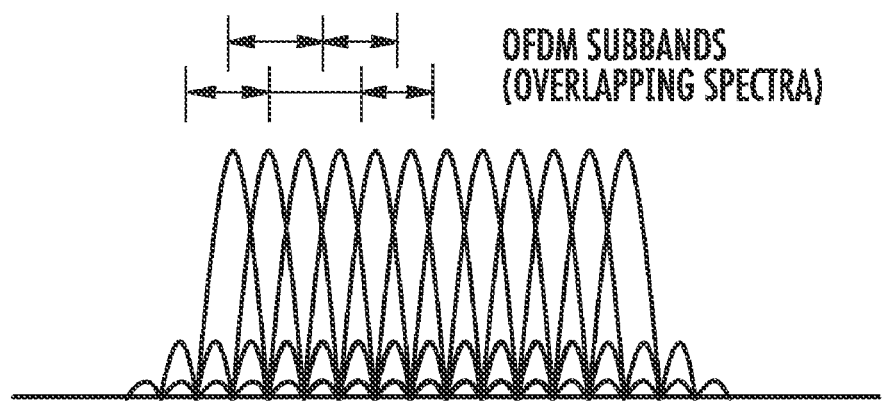

FIGS. 1A and 1B are high-level block diagrams showing basic circuit components of an IEEE 802.11a OFDM modem, and showing the transmitter circuit 30 in FIG. 1A and the receiver circuit 32 in FIG. 1B. The transmitter circuit 30 (also termed "transmitter" for clarity) transmits an OFDM signal as shown in FIG. 2C. By comparison, FIG. 2A shows the spectrum of a single carrier signal and FIG. 2B shows in comparison to the single carrier signal of FIG. 2A, the spectrum of a classical Frequency Division Multiplexing (FDM) signal. FIG. 2C shows the spectrum of an OFDM signal.

The drawings in FIG. 2A-2C show that OFDM is based on a frequency-division multiplexing (FDM) system where each frequency channel is modulated. The frequencies and modulation of an FDM system are now orthogonal to each other to eliminate interference between channels. Because low-rate modulations with relatively long symbols compared to the channel time characteristics are less sensitive to multipath, an OFDM communications system allows a number of low-rate symbol streams to be transmitted simultaneously on multiple carriers rather than having one high-rate symbol stream transmitted on a single carrier. Thus, the frequency spectrum in an OFDM communications system is divided into multiple low-bandwidth subbands. Since each subband covers a relatively narrow section of the frequency spectrum, channel propagation effects are more constant or "flat" over a given subband compared to channel variations over the entire occupied spectrum. Any type of in-phase and quadrature (I/Q) modulation can be used to modulate any subcarrier, for example, Binary Phase Shift Keying (BPSK), Quadrature Phase Shift Keying (QPSK) or Quadrature Amplitude Modulation (QAM), or any of the numerous and different derivations of these modulation schemes. Different signal processing techniques, for example, channel coding, power allocation, adaptive modulation encoding, and similar schemes can be applied to one or more subbands. Multi-user allocation is also possible for example using time, coding, or frequency separation.

In an OFDM communications system using a transmitter and receiver such as shown in FIGS. 1A and 1B, one transmitter will transmit a signal on dozens or thousands of different orthogonal frequencies that are independent with respect to the relative amplitude and phase relationship between the frequencies. Each subcarrier signal typically will have space for only a single narrowband signal because the signals are closely spaced and it is important to prevent signals on adjacent subcarriers from interfering with each other. In an OFDM system, the symbols on each subcarrier are constructed such that energy from their frequency components are zero at the center of every other subcarrier, enabling a higher spectral efficiency for OFDM symbols than is possible in classic FDM.

The OFDM system as shown in FIGS. 1A and 1B includes channel coding as a Forward Error Correction (FEC) technique, using a Forward Error Correction encoder to create a coded orthogonal FDM (COFDM) signal. Channel-State Information (CSI) techniques can also be employed, including continuous wave (CW) interferer and/or selective channel systems.

An OFDM signal is typically the sum of each of the orthogonal subcarriers. Baseband data is independently modulated onto each of the orthogonal subcarriers using some type of modulation, such as Quadrature Amplitude Modulation (QAM) or Phase Shift Keying (PSK) schemes. Because the spectrum of each subcarrier overlaps, it can be considerably wider than if no overlap were allowed. Thus, OFDM provides high spectrum efficiency. Because each subcarrier operates at a low symbol rate, the duration of each symbol in the subcarrier is long. (For clarity, "symbol rate" is equal to the inverse of "symbol duration.") By using Forward Error Correction (FEC) equalization and modulation, there can be an enhanced resistance against a) link dispersion, b) slowly changing phase distortion and fading, c) frequency response nulls, d) constant interference, and e) burst noise. Further, the use of a Guard Interval (GI) or cyclic prefix provides enhanced resistance against multipath in the transmission channel.

Typically, in an OFDM communications system, a subcarrier and somewhat rectangular pulse is subjected to an Inverse Discrete Fourier Transform (IDFT) using an Inverse Fast Fourier Transform (IFFT) circuit within the transmitter. At a receiver, a Fast Fourier Transform (FFT) circuit reverses this operation. The rectangular pulse shape results in a Sin(x)/x spectrum in the subcarriers.

The spacing of subcarriers can be chosen such that the received subcarriers can cause zero or acceptably low Inter-Carrier Interference (ICI) when the receiver and transmitter are synchronized. Typically, OFDM communications systems split the available bandwidth into many narrow-band subbands from as little as a few dozen to as many as eight thousand to ten thousand. Unlike the communications system providing multiple channels using classical FDM as in FIG. 2B, the subcarriers for each subband in OFDM are orthogonal to each other and have close spacing and little overhead, In an OFDM communications system, there is also little overhead associated with any switching that may occur between users as in a Time Division Multiplexing Access (TDMA) communications system. Usually, the orthogonality of subcarriers in an OFDM communications system allows each carrier to have an integer number of cycles over a symbol period. As a result, the spectrum of a subcarrier has a null at the center frequency of its adjacent subcarriers.

In an OFDM communications system, the spectrum required for transmitting data is chosen based on the input data and a desired modulation scheme to be used with each carrier that is assigned the data to transmit. Any amplitude and phase of the carrier is calculated based on the modulation, for example, BPSK, QPSK or QAM as noted before. Any required spectrum is converted using an IFFT circuit to ensure carrier signals are orthogonal.

It should be understood that a FFT circuit transforms a cyclic time domain signal to an equivalent frequency spectrum by finding an equivalent waveform that is generated as a sum of orthogonal sinusoidal components. The frequency spectrum of the time domain signal is usually represented by the amplitude and phase sinusoidal components. The IFFT circuit performs the reverse process and transforms the spectrum of the amplitude and phase into a time domain signal. For example, an IFFT circuit can convert a set of complex data points into a time domain signal of the same number of points. Each complex input point will result in an integral number of sinusoid and cosinusoid cycles represented by the same number of points as were input to the IFFT. Each sinusoid known as the in-phase component, and cosinusoid known as the quadrature component, will be orthogonal to all other components generated by the IFFT. Thus, orthogonal carriers can be generated by setting an amplitude and phase for each frequency point representing a desired subcarrier frequency and performing the IFFT, It should be understood that a guard interval (GI), also termed a cyclic prefix, often is added to an OFDM symbol The guard interval reduces the effects of the wireless channel on Inter-Symbol Interference (ISI) and contains redundant transmission information. For example, in the IEEE 802.11a standard, if a carrier spacing is 312.5 KHz, and the Fourier Transforms are performed over 3.2 microseconds, then a 0.8 microsecond guard interval can be applied for ISI rejection. This guard interval could be the last $T_g$ seconds of an active symbol period that is prefixed to an OFDM symbol, making it a cyclic prefix. It is kept short for a fraction of "T," corresponding to the total length of the active symbol, yet longer than the channel impulse response. This helps reduce the ISI and Inter-Carrier Interference (ICI) and maintain subcarrier orthogonality. In this example, a time waveform appears periodic to the receiver over the duration of the FFT.

To reduce ICI, the OFDM symbol can be cyclically extended in the guard time to ensure that delayed replicas of the OFDM symbol can have an integer number of cycles within the FFT interval, as long as the delay is smaller than the guard time. As a result, multipath signals with delays smaller than the guard time would not produce ICI.

Multipath interference is typically caused when multiple copies of the transmitted signal arrive at the receiver at different times. It should be understood that an OFDM communications system reduces the effect of multipath interference by providing the ability to add signal redundancy in both frequency and time by the use of various coding algorithms. For example, with the IEEE 802.11a standard using OFDM, 48 carriers can be transmitted simultaneously. The coding gain can be provided using a one-half (½) convolutional encoder at the transmitter and later a Viterbi decoder at the receiver. Data bits can be interleaved across multiple symbols and carriers. Lost data often is recoverable because of interleaving across the frequency and time space.

Increasing the data rate requires an increase in the symbol rate for a fixed number of carriers, fixed modulation scheme and fixed sample rate. For a single carrier system, complex equalizers and adaptive filters are required at the receiver to compensate for the magnitude and time distortions caused by the channel. The accuracy and dynamic range required of such equalizers and filters increases markedly as symbol times are decreased. However, in an OFDM system, for example, when 48 subcarriers are transmitted simultaneously, the symbol rate is effectively reduced by 48 times, significantly reducing the requirements of channel equalizers and filters. The reduced symbol rate of an OFDM system enables a robust communication link, resistant to ISI.

It should be understood that an OFDM receiver receives a sum of the different signals as subcarriers. The addition of a guard interval can further enhance performance in an OFDM system by ensuring that no symbol transitions occur during each received symbol time. For example, if an OFDM subcarrier is BPSK modulated, there would be a 180 degree phase jump at symbol boundaries. By choosing a guard interval that is longer than the largest expected time difference between the first and last multipath signals, such phase transitions can occur only during the guard time, meaning there are no phase transitions during the FFT interval. If the phase transitions of a delayed path occur within the FFT interval of the receiver, then the summation of the subcarriers of the first path with the phase modulated waves of the delayed path would no longer produce a set of orthogonal subcarriers, resulting in a certain level of interference.

FIG. 1A illustrates a high-level block diagram of the prior art transmitter 30 for an IEEE 802.11a OFDM modem such as generally described above, and includes a source of communications data 33 and a Forward Error Correction (FEC) Coder circuit 34 that receives a signal representing the communications data 33, and encodes the signal with a forward error correction code as described above. The signal passes to an interleaving and mapping circuit 36 for interleaving and frequency mapping the communications data. An IFFT circuit 38 receives the interleaved and frequency mapped signal and creates multiple time domain carriers summed in a single in-phase/quadrature time domain sequence known as a symbol. A guard interval circuit 40 adds the cyclic prefix guard interval. A symbol wave shaping circuit 42, for example a raised cosine filter, shapes the symbol waveform to limit its spectral content. Afterward, an In-phase/Quadrature (I/Q) modulator 44 processes the baseband I/Q signal, producing I/Q modulation, and also receiving an intermediate frequency (IF) signal from LO signal generator 46. Signal up-conversion to the final transmit carrier frequency occurs at mixer 48, which receives a local oscillator (LO) signal generated by LO signal generator 50. Afterward, the signal is amplified by a High Power Amplifier (HPA) 52, and the OFDM signal is transmitted through an antenna 54 on its carrier wave into the RF channel 31. Various stages of frequency filtering, for example between the I/Q Modulator 44 and mixer 48, and between the mixer 48 and HPA 52, and at the output of the HPA 52 are not shown in the block diagram but typically used.

FIG. 1B shows a high-level block diagram of the prior art receiver circuit 32 used in the exemplary IEEE 802.11a OFDM modem. The antenna 60 receives the OFDM signal from the RF Channel 31 on the carrier wave. It is amplified within a low noise amplifier (LNA) 62. Signal down-conversion occurs within a mixer 64, which also receives a local oscillator signal generated by an LO signal generator 66. An Automatic Gain Control (AGC) amplifier 68 provides automatic gain control to the down-converted signal to ensure the appropriate signal level is applied to the subsequent receiver circuitry. The AGC circuit uses a feedback technique and is well known to those skilled in the art. In-phase and quadrature signal detection occurs within an I/Q Detect circuit 70, which also receives a local oscillator signal generated from a LO signal generator 72, which is also operative with an Automatic Frequency Control (AFC) clock recovery circuit 74, as illustrated. The AFC circuit adjusts the local oscillator 72 frequency to keep the I/Q detector tuned appropriately. The I/Q Detect circuit 70, AFC clock Recovery circuit 74, and LO signal generator 72 form a feedback loop as illustrated and known to those skilled in the art. The guard interval is removed within a Remove GI circuit 76. The Fast Fourier Transform (FFT) is applied on the subcarriers as a reverse of the IFFT within an FFT circuit 78. Demapping and deinterleaving occur within a Demapping and Deinterleaving circuit 80. Forward error correction decoding occurs within an FEC decoder 82, which finishes the signal processing and recovers the original data as received communications data 83. It is thus evident that the function of the receiver circuit 32 as shown in FIG. 1B operates in a manner functionally the reverse of the transmitter circuit 30 shown in FIG. 1A.

As discussed above, OFDM communications systems can use FEC techniques and known interleaving and mapping techniques before IFFT processing as shown in FIG. 1A, and demapping and deinterleaving techniques followed by FEC decoding after FFT processing as shown in FIG. 1B.

FIGS. 3A-3D are graphs showing different representations of a conventional OFDM signal, such as produced by the prior art OFDM modem transmitter 30 shown in FIG. 1A.

Figure 3A:
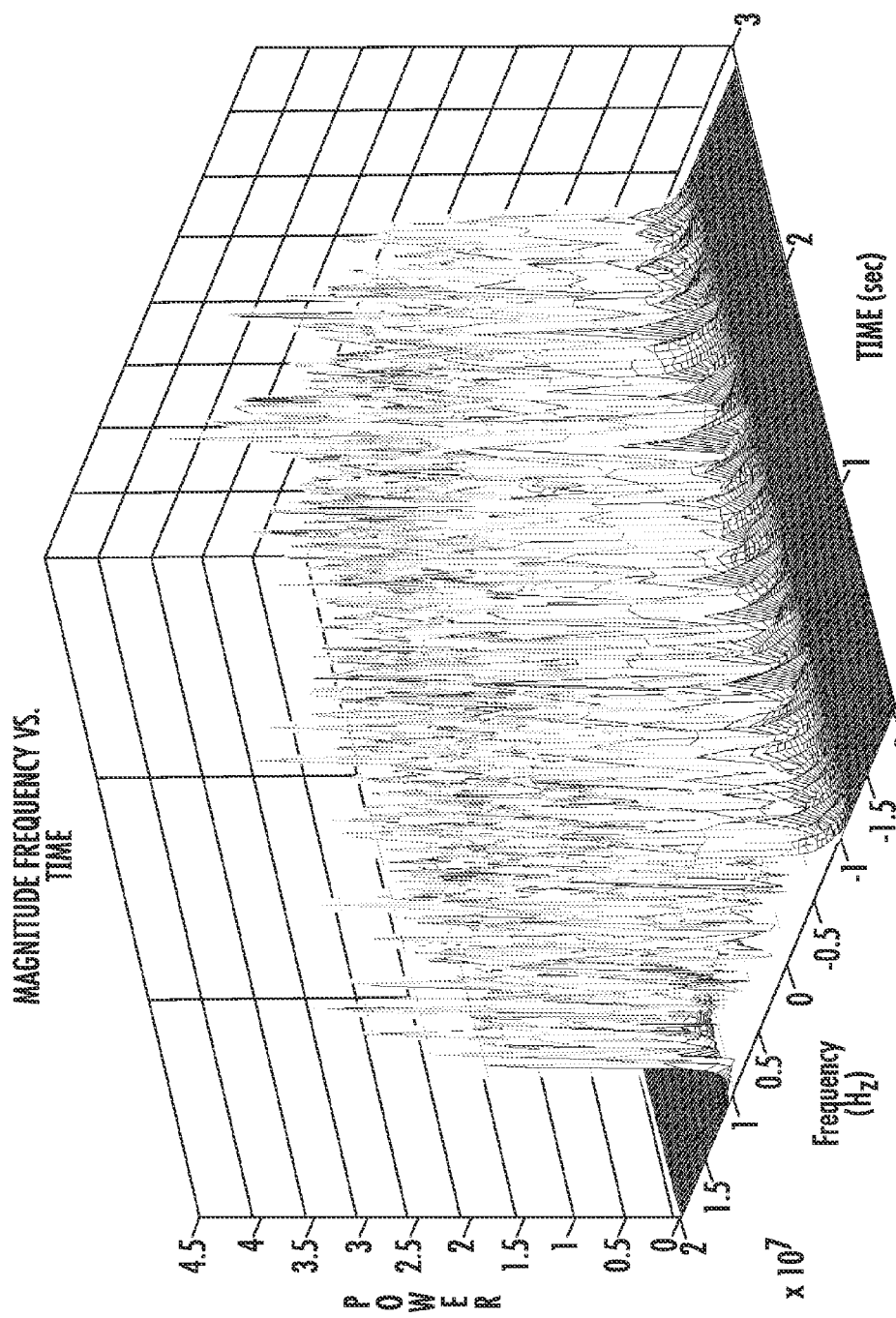
FIG. 3A is a graph showing a three-dimensional representation of a conventional OFDM signal.
Figure 3B:
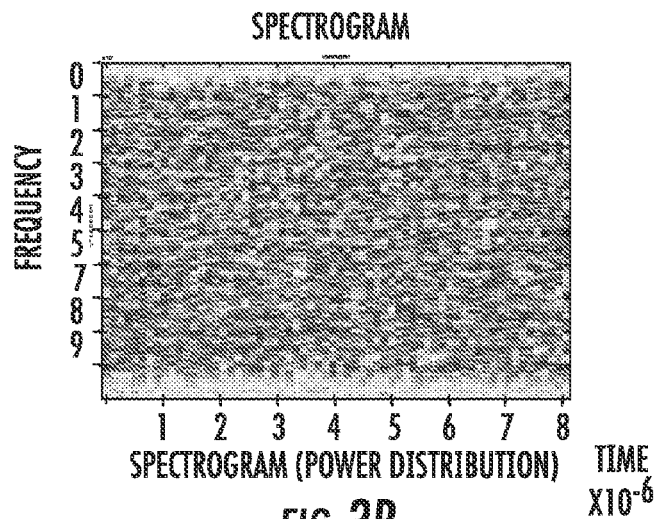
FIG. 3B is a spectrogram showing a power distribution for an example of a conventional OFDM signal such as shown in FIG. 3A.
Figure 3C:
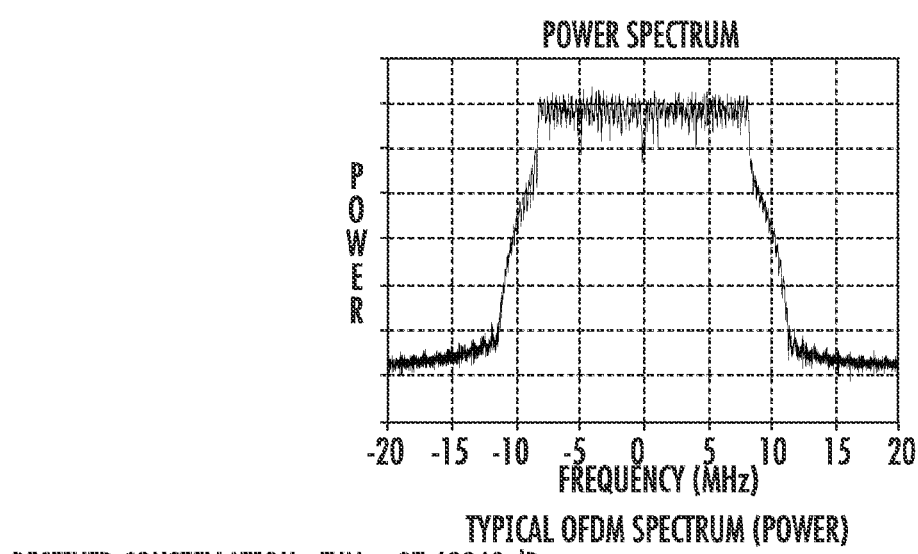
FIG. 3C is a graph showing a two-dimensional representation of a typical OFDM spectrum such as shown in FIG. 3A.
Figure 3D:
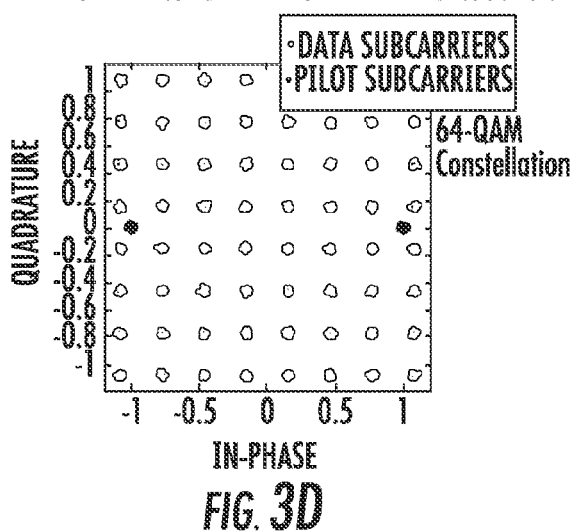
FIG. 3D is graph for a 64-QAM constellation of a conventional OFDM signal such as is shown in FIG. 3A.

FIG. 3A is a graph showing a three-dimensional representation of the OFDM signal with the frequency along one axis, time in seconds along another axis, and the "magnitude" or power on the vertical axis, forming a graph that indicates a magnitude vs. frequency vs. time representation. It is evident from FIG. 3A that the OFDM signal can be detected in the frequency domain. FIG. 3B is a graph showing a spectrogram or power distribution of the OFDM signal shown in FIG. 3A. FIG. 3C is a graph representing a two-dimensional OFDM spectrum of the three-dimensional OFDM signal shown in FIG. 3A. FIG. 3D shows a 64-QAM constellation for the OFDM signal shown in FIG. 3A. These graphs together depict the power distributed over multiple subcarriers.

FIGS. 4A-4D are graphs showing a representation of the OFDM signal spectrum with different frequency subcarriers turned ON and OFF. In the upper left graph (FIG. 4A), the OFDM signal spectrum shows all 52 carriers turned ON, indicating in this non-limiting example an IEEE 802.11a standard using 52 carriers. In the upper right (FIG. 4B) 26 subcarriers are ON, showing the transmit power per subcarrier having a three decibel increase over the 52 carrier case shown in FIG. 4A, due to 26 carriers (subcarriers) being turned OFF. It should be understood that the total transmit power is equal to the area under the curve of the power spectral density function. The lower left and lower right graphs (FIGS. 4C and 4D) show thirteen subcarriers and six subcarriers turned ON respectively. There is a transmit power increase of 6 decibels (6 dB) per subcarrier when 13 subcarriers are turned ON (FIG. 4C) and a 9 decibel (9 dB) increase in transmit power per subcarrier when 6 subcarriers are turned ON (FIG. 4D). Because the peak power is 6 dB higher when the 13 subcarriers are turned ON, the distance in which the signal will be useable (for a free-space channel) will be doubled. Further increases in range may be realized as power per subcarrier is increased. FIG. 4D illustrates reduced Inter-Carrier Interference (ICI) due to the wide spacing of the subcarriers. FIG. 4E is an explanation and equation representing total transmit power from a spectral density function.

It should be understood that OFDM coded transmissions may be easily detected and received by unintended recipients by detection of data subcarriers and pilot tones. The addition of multiple sine waves or carriers with random amplitudes and phases to the waveform will cause it to approach a Gaussian distribution due to the central limit theorem. A signal having a Gaussian random distribution inherently has an enhanced Low Probability of Interception (LPI) and Low Probability of Detection (LPD) because it appears similar to additive white Gaussian noise (AWGN) at a receiver.

In accordance with a non-limiting example, a modified transmitter for a flexible OFDM communications system as explained in detail below uses an IFFT to create multiple subcarriers located at specific frequencies. Only a small subset of the possible carriers need to be used at any one time to enhance power and reduce ICI. Subcarrier center frequencies can be changed at OFDM symbol times according to an encryption algorithm. Such an algorithm can generate a pseudo-random frequency hopping sequence and frequency hopping subcarriers in accordance with a non-limiting example. Thus, fast-frequency hopping can change the subcarriers' frequency for each OFDM symbol, and provide a one thousand (1,000) times faster frequency hopping than the Bluetooth standard, and ten times its data rate. Additional benefits can include a reduced ICI, a reduced ISI, and reduced transmitter overhead from the guard interval. The system, apparatus and method in accordance with a non-limiting example allows a symbol-based randomization for the OFDM signal.

A Walsh transform can be applied to spread subcarriers over the frequency domain, in contrast with spreading over the time domain as with conventional CDMA systems. Applying a Walsh transform to any subset of subcarriers and then further processing using an IFFT circuit can reduce average power per frequency bin for enhanced LPI/LPD. Various aspects of the communications system can be readily varied for improved performance. With fewer subcarriers as compared to the IFFT size and the spreading sequence length, more processing gain may be realized from frequency domain spreading. Furthermore, LPI/LPD and Anti-Jamming (AJ) performance can be enhanced, and there can be higher SNR per subcarrier. Increasing the sample rate also increases the bandwidth, data rate, and improves the LPI/LPD/AJ performance.

FIG. 5 is a graph representing a three-dimensional spectrogram of the symbol-based, frequency randomized subcarriers and showing a comparison in log scale with a magnitude vs. frequency vs. time representation 501. A conventional single frequency carrier signal 502 is overlaid for comparison and illustrated as a single carrier toward the lower frequency end of the band. This single carrier signal acts similarly to a jammer or interferer. The reduced Inter-Carrier Interference (ICI) is shown by an increased frequency carrier spacing. Reduced Inter-Symbol Interference (ISI) is shown by increased symbol spacing per frequency. This ensures that consecutive OFDM symbols subcarriers do not use the same frequency and the adverse effects from multipath delay spread are avoided. The same Instantaneous Signal-to-Noise ratio (SNR) as a single carrier is also illustrated.

There now follows a description of a flexible OFDM communications system that can incorporate the low PAPR preamble in accordance with a non-limiting example of the present invention. The flexible OFDM system is typically full-duplex and has various types of supported modems, including an IEEE 802.11A modem with a maximum data rate of 54 Mbps and IEEE 802.16E modem with a maximum data rate of about 74 Mbps. Some custom modems such as produced by Harris Corporation have a data rate of about 400+Mbps and can be supported. The spectral efficiency can equal the data rate/bandwidth such as for a 16-QAM that is equal to about 143.3 Mbps/52 MHz as 2.76 bits/sec/Hz or 64-QAM as 215.0 Mbps/52 MHz as 4.13 bits/sec/Hz. The flexible OFDM system can use a programmable interleaver and programmable guard interval with an increase of the cyclic prefix for more multipath tolerance and reduced cyclic prefix for less overhead and increased data rate when channel conditions permit.

The flexible OFDM communication system can use a programmable FFT/IFFT in supported FFT sizes of 64, 256, 1024, 2048 and 4096. It has programmable subcarriers with an FFT mapper and a variable number of data carriers and variable number of pilot tones and variable subcarrier locations with the programmable preamble and channel estimation. It allows a PAPR reduction with the LPI/LPD/AJ and fast frequency hopping via the FFT mapper. It includes frequency-domain spreading using a spreading transform with a power amplifier linearization.

The flexible OFDM can use selectable hardware coding and trade FPGA slices versus coding gain in a turbo decoder, Viterbi decoder and with programmable code rates. A programmable window function can have a trade-off window size for multipath robustness versus spectral bandwidth and selectable hardware bit-widths that trades FPGA slices versus performance. For this reason, the low PAPR preamble is advantageous. An example of simulation code is shown below:

```
% Title:            GenLowPAPRCarriers_Tester.m
% Author:           Chris Moffatt
% Program:          OFDM Study
% Date Created:     5/6/2005
% Description:      Generate Low PAPR Sinusoids
% Input Parameters: BANDWIDTH=Desired Bandwidth, Fs=Sampling Frequency, N=Number of Samples
%%%%%%%%%%%%%%%%%%%%%%%%%%%%%%%%%%%%%%%%%%%%%%%%%%%%%
close all; clear; clc      % Close all Matlab figures, clear Matlab program space memory,
      clear text in Matlab command window
fprintf('\n')
%%%%%%%%%%%%%%%%%%%%%%%%%%%%%%%%%%%%%%%%%%%%%%%%%%%%%
%%%%%%%%%%%%% PROGRAM CONTROL PARAMETERS %%%%%%%%%%%%%
PLOTTING   = 'ON';                          % [ON / OFF]
Fs         = 100e6;                         % 100 MHz Sample Rate
% NOTE: USE AN EVEN NUMBER OF CARRIERS
Nc         = 52;                            % Number of Carriers used to Generate
      Impulse
%%%%%%%%%%%%%%%%%%%%%%%%%%%%%%%%%%%%%%%%%%%%%%%%%%%%%
%%%%%%%%%%%%%%%%%%%%%%%%%%%%%%%%%%%%%%%%%%%%%%%%%%%%%%%%%%
      %%%%%%%%
%%%%% GENERATE TIME-DOMAIN, N-CARRIER, QUADRATIC-PHASE COMPLEX ENVELOPE
%%%%%%%%%%%%%%%%%%%%%%%%%%%%%%%%%%%%%%%%%%%%%%%%%%%%%
%%%%% Apply PAPR Reduction
f     = 1:Nc;                               % Frequency of each subcarrier
fc    = (Nc + 1) / 2;                       % Center Frequency
cw    = 2*pi*(f - fc);                      % Radian Frequency Offset (with
      respect to center frequency)
QuadraticPhases = (pi/Nc) * (f-fc).^2;      % Vector of Quadratic Phases (one for
      each carrier)
%%%%% Map Quadratic Phases to their Frequency Carriers via IFFT
FFT_SIZE = 2^ceil(log2(Nc));
ComplexPhases = exp(j*QuadraticPhases);
ifft_in = [0 ComplexPhases(Nc/2+1:end) zeros(1,FFT_SIZE-Nc-1) ComplexPhases(1:Nc/2)];
z = ifft(ifft_in, FFT_SIZE);
%%%%%%%%%%%%%%%%%%%%%%%%%%%%%%%%%%%%%%%%%%%%%%%%%%%%%
%%%%%%%%%%%%%%%%%%%%%%%%%%%%%%%%%%%%%%%%%%%%%%%%%%%%%
%%%%% Plot Results
```

```
if (strcmp(PLOTTING,'ON') == 1)                                          % Check if plotting
    function turned on
    %%%% Calculate Measured PAPR and Theoretical PAPR
    z_mag = abs(z);
    Pavg = mean(z_mag.^2);
    papr = (z_mag.^2) / Pavg;
    PAPR = 10*log10(max(papr));
    theoretical_papr = 10*log10(Nc);
    crlf; fprintf('PAPR of %d Sinusoids Added In-Phase = %f',Nc,PAPR)
    crlf; fprintf('Theoretical PAPR of %d Sinusoids Added In-Phase = %f',Nc,theoretical_papr);
        crlf; crlf
    figure, plot(QuadraticPhases), title('Quadratic Phases')
    figure, plot(z_mag), title(['Complex Envelope (Amplitude) of ' num2str(Nc) ' Carriers']),
        xlabel('Sample')
    figure, plot(10*log10(papr)), title(['PAPR of Complex Envelope in dB of ' num2str(Nc) '
        Carriers']), ylabel('PAPR(dB)')
    figure, plot(fftshift(abs(fft(z)))), title('Impulse Response – Frequency Domain')
    figure, pwelch(z, [ ],[ ],[ ],Fs);
    Plot_CCDF_Curve(z), title('CCDF of Low PAPR Signal')
end
%%%%%%%%%%%%%%%%%%%%%%%%%%%%%%%%%%%%%%%%%%%%%%%%%%%
```

Figure 6:
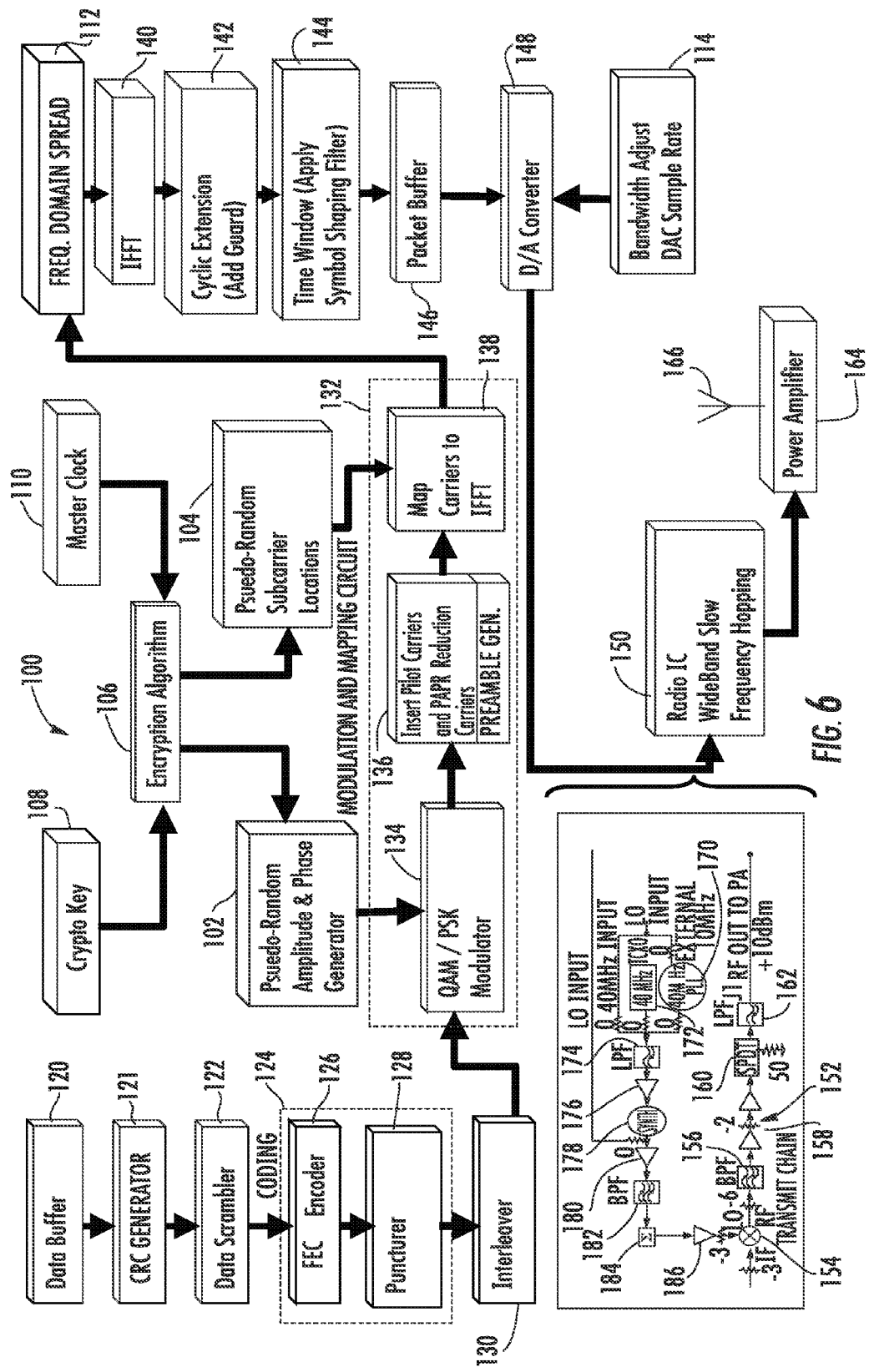
FIG. 6 is a high-level block diagram of a transmitter that can be used for generating a frequency hopping OFDM signal that could be modified and incorporate the low PAPR preamble in accordance with a non-limiting example of the present invention.
Figure 7:
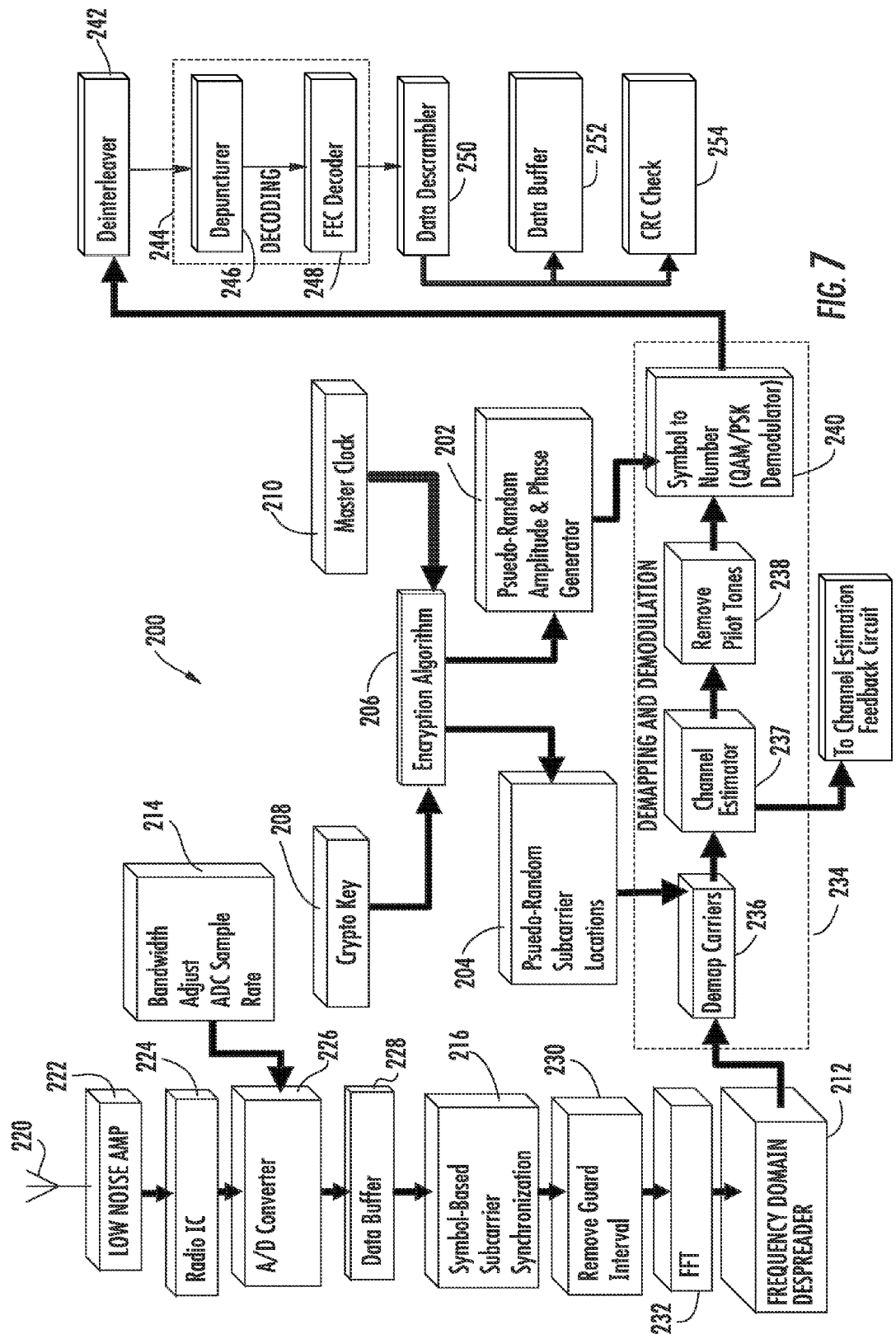
FIG. 7 is a high-level block diagram of a receiver that can be used for receiving and processing a transmitted frequency hopping OFDM signal that incorporates the low PAPR preamble and showing the demapping and demodulation circuit and including a channel estimate circuit for estimating channel response using the low PAPR preamble in accordance with a non-limiting example of the present invention.

Referring now to FIGS. 6 and 7, there are illustrated respective functional block diagrams for a transmitter 100 (FIG. 6) and a receiver 200 (FIG. 7) that provides flexible OFDM and incorporates use of the low PAPR preamble in accordance with non-limiting examples of the present invention. The receiver also includes a channel estimator circuit as explained below and used with the low PAPR preamble for channel estimation such as channel sounding. The transmitter 100 in this non-limiting example as illustrated applies a frequency hopping algorithm to OFDM subcarriers and frequency domain spreading, for example a Walsh transform, before an IFFT circuit and has circuitry and functional algorithms for generating the low PAPR preamble.

Many of the high-level components of the illustrated transmitter 100 and receiver 200 are functionally similar to the components shown in the prior art modem of FIGS. 1A and 1B, but with further details and functional block components added to the transmitter and receiver block diagrams shown in FIGS. 6 and 7 and with capability to incorporate flexible OFDM and the low PAPR preamble. For reference purposes, the description for the transmitter begins with reference numerals in the 100 series and the description for the receiver begins with reference numerals in the 200 series.

Functional components that aid in generating the frequency hopping, OFDM signal that can be Walsh transformed in accordance with a non-limiting example include a Pseudo-Random Amplitude and Phase Generator 102 and Pseudo-Random Subcarrier Locations circuit 104 as generating inputs to a modulation and mapping circuit. Both the Pseudo-Random Amplitude and Phase Generator 102 and Pseudo-Random Subcarrier Locations circuit 104 are operative with an Encryption Algorithm 106 and a Cryptographic and Key generator circuit (Crypto-Key) 108 and Master Clock 110. These components can be generally referred to collectively as an encrypted pseudo-random signal generator A Frequency Domain Spreader circuit 112 is located before an IFFT circuit, as illustrated and explained below, and is operable for frequency spreading the signal, such as by applying a Walsh transform. Also, a digital/analog converter can receive a signal from a Bandwidth Adjust DAC Sample Rate circuit 114 for removing spectral lines. These components are explained in further detail below.

As illustrated in FIG. 6, a signal is received within a data buffer 120 and passes through a CRC generator 121 and data scrambler 122. An FEC encoder circuit shown by the dashed lines at 124 can include a Forward Error Correction encoder 126, for example, a convolutional encoder and puncturer circuit 128. The encoded signal is interleaved within an interleaver circuit 130. The signal passes into a modulation and symbol mapping circuit shown generally by the dashed lines at 132. This modulation and symbol mapping circuit 132 includes a QAM/PSK modulator 134 and Insert Pilot Carriers and PAPR Reduction Carriers circuit 136 that inserts pilot carriers and PAPR reduction carriers into the signal. A circuit can generate a preamble sequence and insert the sequence to be received with selected preamble subcarriers and quadratically modulated. The circuit 136 could include a preamble sequence generator for generating a preamble sequence as a training sequence explained in greater detail below. Carriers are mapped to the IFFT in a matrix operation in a subcarrier mapper circuit 138.

The Encryption Algorithm 106 is operative not only with the Crypto-Key circuit 108 and the Master Clock 110, but also the Pseudo-Random Amplitude and Phase Generator 102, which generates pseudo-random signals to the QAM/PSK Modulator 134 in accordance with a non-limiting example of the present invention. The Pseudo-Random Subcarrier Location circuit 104 is also operative with the Subcarrier Mapper circuit 138 and receives signals from the Encryption Algorithm 106. The OFDM Subcarriers are frequency hopped quickly by means of such circuits.

In accordance with a non-limiting example, the Frequency Domain Spreader circuit 112 is located before the IFFT circuit 140 and applies the Walsh transform or other linear operator transform in the frequency domain. If the Frequency Domain Spreader circuit 112 were located after the IFFT circuit 140, then the Walsh or other function would force a time-domain spreading. It should be understood that the Frequency Domain Spreader circuit 112 and IFFT circuit 140 can typically be considered with the modulation and mapping circuit 132 as an OFDM modulation circuit or OFDM modulation and mapping circuit. In accordance with a non-limiting example, the spreading resulting from application of the Walsh transform occurs in the frequency domain. A cyclic extension as a guard interval is then added within a Cyclic Extension circuit 142. A symbol-shaping filter 144 such as a Finite Impulse Response (FIR) filter, cosine filter, or raised cosine filter can be operative as a "Time Window" for symbol shaping in conjunction with the Cyclic Extensions. A packet buffer 146 receives the signals, and after buffering, the signals are converted to analog signals in a digital/analog converter 148. The D/A converter 148 also receives from a Bandwidth Adjust DAC Sample Rate circuit 114 a signal for further processing that removes spectral lines. The D/A Converter 148 passes signals to a Radio Integrated Circuit (IC) Wideband Slow Frequency Hopping circuit 150. The RF carrier can be subjected to a pseudo-random frequency hopping algorithm for enhanced bandwidth, and is operative also as a frequency up-converter, as illustrated.

Basic components of the frequency up-converter circuit 150 can include a transmit chain circuit 152 that receives the signal into a mixer 154. The signal passes through a Bandpass Filter 156, a series of amplifiers 158 and through a Single Pole Double Throw (SPDT) switch 160. After switching, a low pass filter 162 filters the signal. The radio frequency signal is amplified by the Power Amplifier 164 for subsequent transmission through antenna 166. Other components in the circuit 150 include a phase-locked loop circuit 170, a 40 MHz signal generator 172 as a non-limiting example, a low pass filter 174, an amplifier 176, a synthesizer 170, another amplifier 180, a bandpass filter 182, a summer circuit 184, and another amplifier 186 that connects to the mixer 154. The component parts of the frequency upconverter circuit 150 may be used to affect a low rate frequency hopping scheme, where the entire OFDM baseband waveform is frequency translated to different center frequencies. Such slow frequency hopping can further guard against interference and provide an additional level of encryption if the slow hopping sequence is designed as such.

The transmitter 100 as described is a non-limiting example and other types of transmitters could be used. It should be understood that with advances in DSP and other circuit functions, processing can possibly occur at baseband. The low PAPR preamble is processed and part of this signal. As will be explained, the low PAPR preamble, in accordance with non-limiting examples, uses quadratic phases applied to each active subcarrier in order to achieve a typical PAPR of about 2.6 dB.

It should also be understood that the subcarrier mapper circuit 138 maps carriers to the IFFT circuit 140. For example, if the IFFT circuit 140 has an input with a 64 sample signal in the frequency domain, it would give a 64 sample signal in the time domain as a matrix operation. The subcarrier mapper circuit 138 can change the order of the vectors to position symbols on arbitrary subcarriers and apply zero to other subcarriers. For example, some of the samples in a 64 sample vector would be zeros, meaning they would not show up in the frequency domain if they are OFF. Any that are ON or non-zero will change location with every IFFT cycle (once per symbol) to produce the frequency hopping OFDM signal. The nature of the frequency hopping for the OFDM signal is generated by the Encryption Algorithm 106 and the Pseudo-Random Subcarrier Locations circuit 104 and the Pseudo-Random Amplitude and Phase Generator 102. The QAM/PSK Modulator 134 aids in producing the constellation amplitude and phase.

One of the aspects could involve obscuring to an unintended receiver that the data has been encrypted. To obscure the encryption, three unknowns are produced by the transmitter. For example, there is a) the unknown of the transmitted amplitude and phase; b) the unknown of the pseudo-random amplitude and phase; and c) the unknown of the channel amplitude and phase. Because there are three unknowns, it is not possible to know which signal is transmitted with an encryption algorithm, based on the Cryptographic Key and Master Clock, The frequency domain spreader circuit 112 operates as a matrix operation. For example, if a 64 IFFT circuit 140 is employed, then a 64×64 Walsh matrix (as a non-limiting example) can be used to frequency-spread the subcarriers and provide processing gain. An input vector would be multiplied by the Walsh matrix. It should be understood that a Walsh matrix is a square matrix with dimensions that can be a power of "two." The entries are positive or negative one (+1, −1). The Walsh matrix can be obtained from a Hadamard Matrix that is defined by a recursive formula of the same dimension by arranging rows such that the number of sign changes is in increasing order, i.e., sequential ordering. Each row of a Walsh matrix corresponds to a Walsh function. The ordering of rows in a Walsh matrix can be derived from ordering a Hadamard matrix by applying a bit-reversal permutation and a Gray code permutation. The Walsh functions form an orthogonal basis of a square that is integratable on a unit interval. Thus, it can generate statistically unique sets of numbers suitable for use in encryption, also known as "pseudo-random and noise codes." The multiplication may be implemented efficiently as a series of additions and subtractions.

The Bandwidth Adjust DAC Sample Rate circuit 114 is operative with the D/A converter 148 and can adjust the sample rate and remove spectral lines. As a result, it is harder to detect the waveform with a Spectrogram. It should be understood that the transmitter 100 as described is operative to form a Frequency Hopping OFDM signal with a Walsh transform. For example, if an IFFT is used with 64 samples per symbol, the frequency location of each subcarrier can be changed every 64 samples. As an example, if an IFFT is computed every four microseconds, then frequency hopping on all 64 carriers can occur every four microseconds to impart a fast hopping rate. Because this can be accomplished symbol-by-symbol, the frequency hopping OFDM communications system as described can also be termed a Symbol-Based Randomized OFDM because the subcarrier frequency locations are randomly changed. Another receiver would not be able to determine the subcarrier locations without the Encryption Algorithm and related circuits, and a full synchronization.

FIG. 7 shows a high-level functional block diagram of a receiver 200 that can be used for processing the OFDM communications signal that incorporates the low PAPR preamble in accordance with a non-limiting example of the present invention and includes an added channel estimator circuit 237 as part of the demapping and demodulation circuit. Similar components that are used in the block diagram of FIG. 6, such as an Encryption Algorithm circuit, Cryptographic Key circuit, Master Clock, Pseudo-Random Amplitude and Phase Generator, Pseudo-Random Subcarrier Locations circuit, and Bandwidth Adjust ADC Sample Rate circuit are given similar reference numerals as used in FIG. 6, except they are now placed in the 200 series. This receiver circuit 200 includes a Symbol-Based Subcarrier Synchronization circuit 216. It also uses a Frequency Domain Despreader circuit 212 instead of a Frequency Domain Spreader circuit 112 as in the transmitter 100 of FIG. 6.

Other high-level components illustrated for this receiver circuit 200 include an antenna 220, a low noise amplifier (LNA) 222, and Radio Integrated Circuit down-converter 224, which can process a frequency hopping carrier signal in reverse if it had been processed for wideband by the Radio IC Wideband Slow Frequency Hopping circuit 150 shown in the transmitter 100 of FIG. 6. The Analog/Digital Converter 226 receives an IF or baseband signal from the down-converter 224, and a signal from the Bandwidth Adjust ADC Sample Rate circuit 214 and reverses the process used at the transmitter 100. The signal is forwarded to the Data Buffer 228 and Symbol-Based Subcarrier Synchronization circuit 216, which synchronizes the subcarriers for further processing using, for example, the low PAPR preamble. The Guard Interval circuit 230 removes the guard interval and the signal is processed with the Fast Fourier Transform as an OFDM demodulator in an FFT circuit 232. The Inverse Walsh Transform is applied in an Inverse Walsh Transform circuit 212. A subcarrier demapper and demodulation circuit is shown by dashed lines at 234 and performs an inverse mapping operation to the subcarriers in subcarrier demapper circuit 236.

This circuit is followed by the channel estimation using the channel estimator 237, operative with the incorporated low PAPR preamble such as for channel sounding and can operate with a channel estimate feedback circuit that can transmit data regarding the communications channel back to the transmitter. This is advantageous to determine the useful duration of channel adaptation information and overcome the problems when propagation channels change rapidly due to Doppler or other factors related to the coherence time of the channel such as the time domain and Doppler spread, where the Doppler spread and coherence time are inversely proportional to one another and characterize the time varying nature of the frequency disbursiveness of a channel in the time domain. In addition, the transmitter can use the feedback information to adaptively select subcarriers for transmission and change subcarrier modulation for adaptive interference mitigation. Various amounts of spreading can be applied to the subcarriers depending on the amount of processing gain required to overcome the intentional or unintentional interference. Additional spreading can be applied to mitigate frequency selective fading based on the channel conditions indicated by the feedback signal. Typically, the symbol duration is much longer than the length of a channel impulse response so that inter-symbol interference is avoided by inserting a cyclic prefix for each OFDM signal. Additional performance can be extracted in the presence of channel state information at the transmitter such that knowledge of a channel at the transmitter can be used to improve link performance, reliability and range. Thus, channel knowledge at the transmitter provides the ability to determine the quality of a channel response across the signal bandwidth to select the best portion of the band on which to transmit. The channel knowledge can be used by a base station or other transmitter to transmit data streams to multiple subscribers on the same time-frequency resources. Sometimes a subscriber or other receiver can measure the downlink (DL) channel using the channel estimator 237 and transmit a feedback message that could contain information enabling the base station to perform some type of closed-loop transmission on the down link. Given a reciprocal link, it is also possible to transmit channel sounding waveforms on the up link to enable the base station to determine the base station to subscriber station channel response.

The pilot tones are removed in a pilot remove circuit 238 and the signal is demodulated in a Symbol to Number (QAM/PSK) Demodulator circuit 240. The deinterleaver circuit 242 deinterleaves the signal. A decoding circuit is shown by dashed lines at 244 and is operative for depuncturing within depuncture circuit 246 and Forward Error Correction (FEC) decoding such as Viterbi decoding within a FEC decoder such as a Viterbi decoder 248. Data descrambling occurs at a Data Descrambler 250, followed by data buffering in data buffer 252 and processing for a CRC check by CRC circuit 254.

The transmitter 100 and receiver 200 shown in FIGS. 6 and 7 can generate and receive a signal that is a fast-carrier frequency hopping signal. This hopping can be much faster than a conventional Bluetooth system that hops frequencies at 1600 hops/second over a 80 MHz radio frequency bandwidth using a single carrier having a 1 MHz bandwidth. It should also be understood, for example, as shown in the graphs of FIG. 4, that a change in signal-to-noise ratio (S/N) can be based on the number of subcarriers and can be used as a method of varying the range of the instantaneous subcarrier signal-to-noise ratio versus that data rate in an adaptive wireless communications system.

For example, the receiver 200 could measure the received Signal-to-Noise ratio per subcarrier, for example, by using channel estimation symbols, the low PAPR preamble, or a special channel estimation packet. In accordance with a non-limiting aspect, the low PAPR preamble is advantageous for this purpose. Information can be passed back to the transmitter as a "channel mask," specifying the number of subcarriers to "turn-off" and the possible frequency locations of interferers as channel impairments such that the transmitter 100 could use the negotiated channel mask to avoid transmission on any undesirable frequencies. In one example, ten carriers are turned ON simultaneously over a 100 MHz bandwidth, and each carrier is transmitted for 640 nanoseconds (corresponding to a 1/FFT rate), such that each carrier can hop 1,562,500 times per second. This is about a one thousand times faster hopping than the Bluetooth protocol and can provide more than ten times the data rate.

The transmitter 100 can create multiple subcarriers located at specific frequencies and can generate a pseudo-random frequency hop for each subcarrier frequency by applying the frequency hopping algorithm as explained before. The IFFT circuit 140 creates multiple subcarriers located at specific frequencies. In accordance with a non-limiting example, only a small subset of all possible subcarriers need to be used at any one time, although all subcarriers can be used if necessary. For example, as in the example discussed above, instead of 64 subcarriers, only 10 subcarriers can be used in this non-limiting example, giving in that example the 1,562,500 hops per second.

The subcarrier center frequencies can be changed at the OFDM symbol rate using the encryption algorithm for the pseudo-random frequencies. This occurs at the modulation and mapping circuit 132 in which the carriers are mapped to the IFFT. The center frequencies of the subcarriers can appear random because of the frequency hopping algorithm. The symbol time duration can be very short as noted above, and therefore, each subcarrier would appear for a short time at any specific frequency.

In some aspects, the guard time can be reduced or eliminated by ensuring that consecutive symbols do not contain subcarriers at the same frequency location. For example, in prior art systems, if two symbols are back-to-back on the same frequency, multipath signals could arrive at different times at the same location. By using the system and circuits shown in FIGS. 6 and 7, these signals do not appear on the same frequency and the signal would typically not be affected by multipath, thus preventing Inter-Symbol Interference (ISI) and substantially reducing required guard time, reducing transmission overhead, and increasing data rate.

It is possible using the transmitter 100 and receiver 200 as shown in FIGS. 6 and 7 to eliminate or substantially reduce guard time, e.g., "guard interval." Also, it should be understood that an additional guard can be added by modifying the frequency hopping algorithm such that no frequency can be used twice in a row for consecutive symbols, and thereby preventing Inter-Symbol Interference (ISI) because of multipath channel effects. As noted before, this eliminates or substantially reduces the required guard interval, reduces transmission overhead, and increases the data rate.

It is also possible to dynamically add and remove subcarriers depending on the required data rate for an "on-the-fly"

adaptation as a flexible OFDM system. The minimum carrier spacing can increase to reduce the Inter-Carrier Interference (ICI) and provide robustness to jamming i.e. anti-jamming (AJ) capability, because of the frequency hopping signal. As long as carriers are not transmitted next to each other in the frequency domain, the Inter-Carrier Interference will be reduced.

It is also possible for the carrier frequency to hop pseudo-randomly and cover a wide bandwidth. This can be accomplished by the Radio IC Wideband Slow Frequency Hopping circuit 150 shown in FIG. 6 and operative as a frequency up-converter circuit.

A "dead-time" pseudo-random generator can be introduced into the system to decrease "ON" time, and the output spacing between symbols can be increased. The spacing can be varied using the pseudo-random generator to prevent spectral lines and reduce cyclostationary statistics of the signal. This type of system can be implemented without an output sample control. The system can wait a random amount of time before transmitting. By removing the spectral lines, it is more difficult for other systems to detect the transmitted communications. The term cyclostationary can refer to the mean standard deviation as a second order statistic of the signal. The output sample control can refer to control at the D/A Converter 148.

The subcarrier constellation amplitude and phase values can also be varied pseudo-randomly using the generator 102 operative with the modulator 134 as shown in FIG. 6. For example, pseudo-random amplitude and phase values can be generated using the encryption algorithm. The pseudo-random amplitude and phase values can be added to the intended amplitude and phase values before transmission. By adding the pseudo-random amplitude and phase values to each subcarrier, the symbol constellation is no longer a standard QAM/PSK. If the transmitter signal is detected by an unintended receiver, that receiver would not be able to demodulate the signal because there would be too many unknowns. For example, the transmitted or intended amplitude and phase would be an unknown, together with the pseudo-random amplitude and phase that is added to the signal, and a further unknown being the channel amplitude and phase for the multipath. This results in three unknowns. The pseudo-random amplitude and phase values would appear as a typical random channel effect to the unauthorized or unintended receiver.

It should be understood that these algorithms can be added to Software Defined Radios (SDR) and can be implemented with some changes to vary data rate and modulation. The data rates, bandwidth, transmission power and LPI/LPD performance can be improved by varying the subcarrier modulation scheme, sample rate, IFFT size, IFFT duration and the number of subcarriers used per OFDM symbol.

As shown in FIG. 6, a Walsh transform can be applied in the frequency domain for frequency spreading, since it is applied before the IFFT circuit 140 using the Frequency Domain Spreader circuit 112. It is known that Walsh transforms are typically used in communications systems such as CDMA for time-domain spreading and for creating orthogonal codes for multiple access schemes. The Walsh Transform can be used in the system, apparatus, and method as illustrated to spread subcarriers over the frequency domain. This can provide a significant reduction in the average power (dBm/Hz/sec) for enhanced LPI/LPD performance, allowing more transmit power within the same FCC spectral mask and reducing the effect of Frequency Selective Fading by providing a frequency-domain processing gain. It also provides additional anti-jamming (AJ) robustness. Also, out-of-band noise (OBN) emissions can be reduced similar to time-windowing because of the steeper "roll-off" caused by the Walsh transform. The Walsh transform as a matrix is made up of only positive and negative ones (+1, −1) and requires only additions and subtractions, and no multiplications. This would allow a trade-off for the number of carriers versus the data rate versus the transmit power and distance for the same FCC spectral mask. In the Walsh transform, matrix rows can be exchanged with each other. The transform would still be orthogonal at the receiver 200. These row permutations can be performed to increase further the LPI.

It should be understood that OFDM is susceptible to Frequency Selective Fading because of multipath. The Walsh transform can provide processing gain to the system and robustness against frequency selective fading.

The system, apparatus and method as described provides a very fast frequency hopping by changing subcarrier frequency locations, for example, at the OFDM symbol rate. Thus, it can provide a reduced spectral density over time (decibel/hertz/second) in order to provide a Low Probability of Interception (LPI) and Low Probability of Detection (LPD). The system as described is much faster than Bluetooth systems, and makes the transmission within the FCC spectral mask possible. It also eliminates or substantially reduces a guard interval by ensuring that subcarriers do not appear on the same frequency for consecutive OFDM symbols. The system also provides robustness against Inter-Symbol Interference (ISI) due to multipath. The Walsh transform can be applied in the frequency-domain to spread the frequency-hopping subcarriers over the spectrum and reduce the power spectral density (decibels over hertz) to improve LPI/LDP performance or help comply with FCC spectral mask requirements. It can also provide a processing gain against frequency selective fading and provide robustness against jamming.

In accordance with a non-limiting example, the low PAPR preamble is used for channel estimation in one non-limiting example. The low PAPR preamble has a PAPR that typically does not exceed 2.6 dB in one non-limiting example, regardless of the number of subcarriers. Typically, the subcarriers are evenly spaced and have equal amplitude, which is ideal for channel sounding. The result is a low PAPR preamble that operates over a variable number of subcarriers and improves SNR. Both simulations and measurements demonstrate significant benefits of the proposed low PAPR preamble in long-range wireless communications applications that use an OFDM waveform for radio communication.

The low PAPR preamble, in accordance with a non-limiting aspect, has a typical PAPR of 2.6 dB in a non-limiting example, regardless of the number of subcarriers. This low PAPR preamble requires less back-off from the P1 dB point of a power amplifier typically used in the communications circuit, allowing higher transmit power. This enhanced transmit power during the preamble results in improved channel estimation at the receiver. In addition, more SNR for channel equalization allows a lower BER. In communications systems where a higher SNR is required for detection than for data symbol decoding (due to robust Turbo/LDPC FEC coding schemes), this technique using the low PAPR preamble provides higher SNR for detection and provides lower PAPR than existing preamble techniques. In addition, the low PAPR preamble provides good correlation properties for detection and an efficient implementation using IFFT/FFT. The subcarriers are typically evenly spaced and have equal amplitude, ideal for channel sounding. The lower PAPR preamble results in the use of power amplifiers having a lower cost, Size, Weight, and Power (SWaP).

Both the commercial and the government (military) market are demanding communications systems with higher data rates and an increased spectral efficiency (i.e., increased bandwidth utilization). Increasing the data rates and spectral efficiency for OFDM involves increasing the number of subcarriers. The larger number of subcarriers leads to higher PAPR, which leads to larger power amplifiers, consuming more cost, Size, Weight, and Power (SWaP). Being independent of the number of subcarriers, this low PAPR preamble allows reduced preamble PAPR, provides optimal channel estimation, good correlation properties for detection, and efficient implementation via IFFT/FFT.

Figure 8:
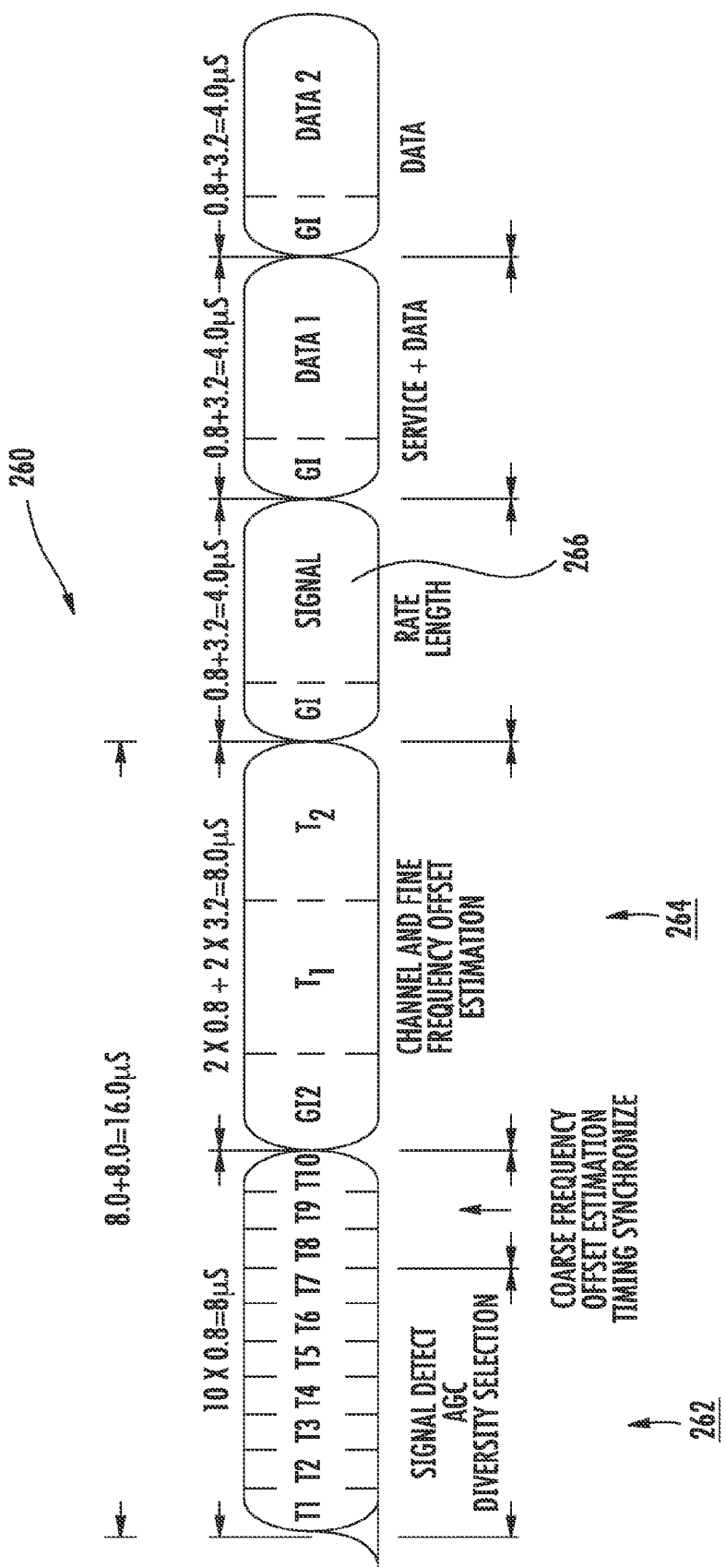
FIG. 8 is a graphical and frequency representation of a typical OFDM preamble as established by IEEE that can be modified as a low PAPR preamble in accordance with the non-limiting example of the present invention.

It should be understood that OFDM preambles are used for many purposes. FIG. 8 is an example of an OFDM preamble such as established by IEEE and shown generally at 260. The shorter sync symbols 262 are used for signal detection, Automatic Gain Control (AGC), antenna diversity selection, coarse frequency offset estimation, and timing synchronization. The longer sync symbols 264 provide channel estimation and fine frequency offset estimation. For channel estimation, it is desirable to have a sample for each subcarrier at the center of its frequency bin using evenly spaced, equal amplitude subcarriers. The resulting fluctuations in the preamble's received nominally flat-topped spectrum reflect the frequency response of the channel.

There now follows a general description of techniques to apply the quadratic phase to obtain the low PAPR preamble in accordance with non-limiting examples. General calculations and methodology are first explained and followed by a more detailed description relative to generating and processing the low PAPR preamble. It is well known that the addition of N sinusoids produces a time-domain waveform with a certain PAPR. By setting the phase of each sinusoid to a specific angler it is possible to produce a symbol or waveform with minimal PAPR. By applying quadratic phases to each subcarrier, a typical PAPR of 2.6 dB can be achieved. Depending on the number of subcarriers, the value of PAPR using the quadratic phasing as described below can slightly vary. The typical range of PAPR values depends on the number of subcarriers and usually ranges from 2.9 dB for low number of subcarriers to 2.6 dB for a large number of subcarriers. As the number of subcarriers increase, the value stabilizes about 2.6 dB PAPR. This technique is considered distortionless since only phase values of the sinusoids are adjusted and no clipping, filtering, or companding of the time-domain waveform is applied. It is still possible to achieve lower PAPR through signal distortion techniques at the cost of in-band and out-of-band interference.

Consider $N_c$ orthogonal complex exponentials with identical amplitude and equally spaced $\Delta f = 1/T_{sym}$ Hertz apart, where $T_{sym}$ is the symbol duration. The output multicarrier waveform is formed by the summation of the complex exponentials (Equation 1):

$$x(t) = \sum_{k=0}^{N_c-1} A_k \cdot e^{-j(2\pi(f_k - f_c)t + \phi_k)}$$

Where $f_k$ are the subcarrier center frequencies $f_k = f_o : \Delta f$: $f_{max}$, $f_o$ is the fundamental (lowest) subcarrier frequency, and $f_{max}$ is the highest subcarrier frequency. The frequency $f_c$ is used to center the complex spectrum about the origin (Equation 2).

$$f_c = \frac{f_{max} + f_o 1}{2} \text{ and } f_{max} = \Delta f \cdot (N_c - 1) + f_o$$

[1] Note that when using an odd number of symbols $N_{sym}$ and analyzing the spectrum with an FFT, add an extra ±1/2 to $f_c$ to allow subcarriers to fall onto integer frequency bins in order to avoid Inter-Carrier Interference (ICI).

In general, $F_s \geq 2 \cdot f_{max}$, $T_s = 1/F_s$, $T_{sym} = 1/\Delta f$, $N = N_{sym} \cdot (F_s \cdot T_{sym})$ and $t = 0 : T_s : T_s \cdot N - T_s$, where $N_{sym}$ is the number of symbols to generate. The maximum PAPR that occurs when all $N_c$ subcarriers are added in phase is (Equation 3):

$$\text{PAPR}_{max} = 10 \log(N_c)(\text{dB})$$

The ideal phase relationship for producing the minimum PAPR is obtained by passing the zero-phase complex envelope of the summed complex exponentials through the transfer function (Equation 4):

$$H(\omega) = e^{-j\left(\frac{\omega^2}{4\alpha}\right)}$$

where $$\alpha = \frac{N_c \pi}{T^2}$$

This phase relationship provides (Equation 6):

$$\text{PAPR}_{typ} = 2.6 \text{ dB}$$

independent of the number of carriers and frequency spacing.

The new output multi-carrier waveform with PAPR of about 2.6 dB is formed by applying the quadratic phases (Equation 7):

$$\phi_k = \frac{\omega^2}{4\alpha} = \frac{\pi}{N_c}\left[\frac{(f_k - f_c)}{\Delta f}\right]^2,$$

where $\Delta f = 1/T$

The continuous-time low PAPR preamble signal is found by substituting equation (7) into equation (1) to yield (Equation 8):

$$x(t) = \sum_{k=0}^{N_c-1} A_k \cdot e^{j\left(2\pi(f_k - f_c)t + \frac{\pi}{N_c}\left[\frac{(f_k - f_c)}{\Delta f}\right]^2\right)}$$

The discrete preamble signal x(n) can be generated using an IDFT by centering the subcarriers about DC on integer subcarrier center frequencies and setting Δf=1 (Equation 9):

$$x(n) = \frac{1}{N} \cdot \sum_{k=-\frac{N_c}{2}}^{\frac{N_c}{2}-1} A_k \cdot e^{j\left(\frac{2\pi \cdot k \cdot n}{N} + \frac{\pi}{N_c} k^2\right)}$$

$$= \frac{1}{N} \cdot \sum_{k=-\frac{N_c}{2}}^{\frac{N_c}{2}-1} \left(A_k \cdot e^{j\left(\frac{\pi}{N_c} k^2\right)}\right) \cdot e^{j\left(\frac{2\pi \cdot k \cdot n}{N}\right)}$$

where N is the IDFT size and n=0:N−1. The low PAPR preamble is now computed efficiently using an IFFT (Equation 10):

$$x(n) = \frac{1}{N} \sum_{k=0}^{N-1} X_k \cdot e^{j\left(\frac{2\pi \cdot k \cdot n}{N}\right)}$$

where the complex quadratic subcarrier values are (Equation 11):

$$X_k = A_m \cdot e^{j\phi_m}$$

with quadratic phase (Equation 12):

$$\phi_m = \begin{cases} \frac{\pi}{N_c} \cdot m^2 & -\frac{N_c}{2} \leq m < \frac{N_c}{2} \\ 0 & \text{elsewhere} \end{cases}$$

and amplitude (Equation 14):

$$A_m = \begin{cases} A & -\frac{N_c}{2} \leq m < \frac{N_c}{2} \\ 0 & \text{elsewhere} \end{cases}$$

The discrete frequency m preorders the IFFT input data (i.e. performs an FFT shift) and is obtained using the modulo function (Equation 14):

$$m = \mod\left(k + \frac{N}{2}, N\right) - \frac{N}{2}$$

Furthermore, by application of this quadratic phase relationship, the location where the maximum peak occurs in time becomes deterministic. The maximum PAPR of y(t) occurs at approximately (Equation 6):

$$t = \left(\pm\left(\frac{T}{2}\right) - 1.163 \cdot \frac{T}{\sqrt{2N}}\right)$$

Simulations have been run in order to verify creating multi-carrier signals that possess a PAPR of about 2.6 dB, independent of the number of carriers. The sinusoids produce maximum PAPR when added together with identical phases and produce a PAPR of about 2.6 dB when added together with optimum quadratic phases. These two cases are compared through simulation using 64-carriers (complex sinusoids).

Figure 9:
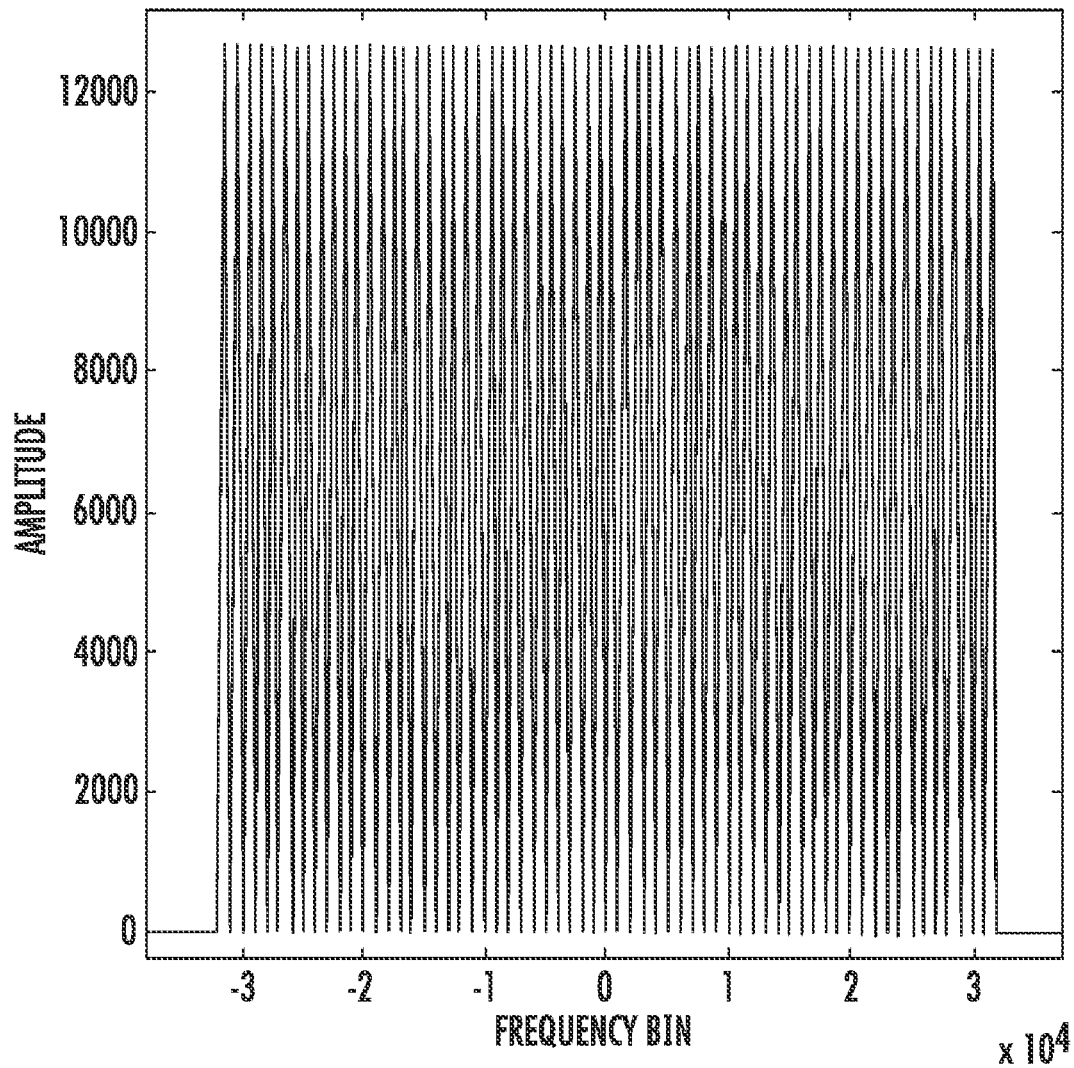
FIG. 9 is a graph showing the FFT of 64 subcarriers in an OFDM communications system.

FIG. 9 shows 64-complex sinusoids in the frequency domain. The subcarriers are evenly spaced in frequency for the quadratic phase calculations to produce the desired result.

Figure 10:
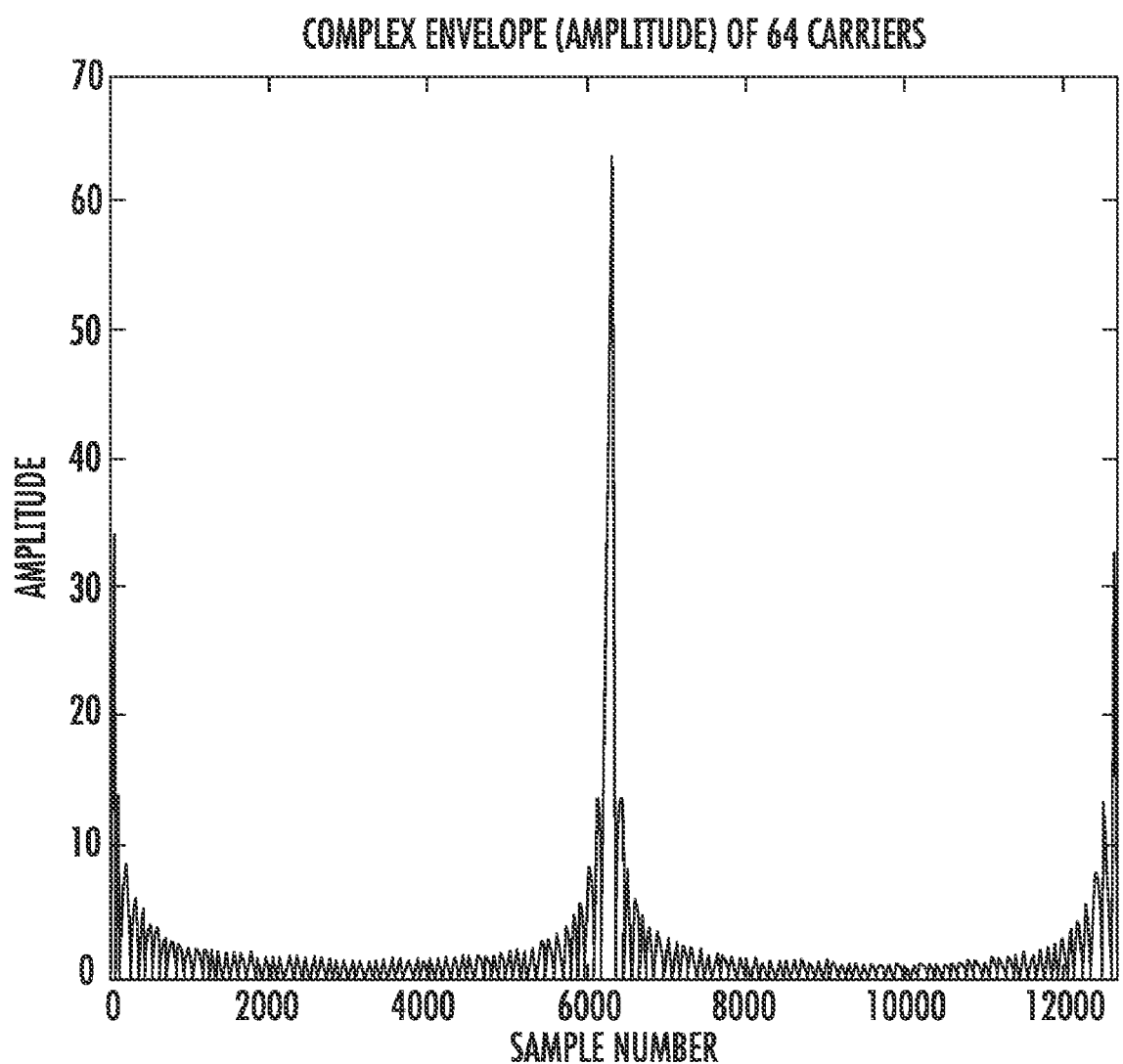
FIG. 10 is a graph showing the complex envelope of 64 carriers at zero-phase in an OFDM communications system.
Figure 11:
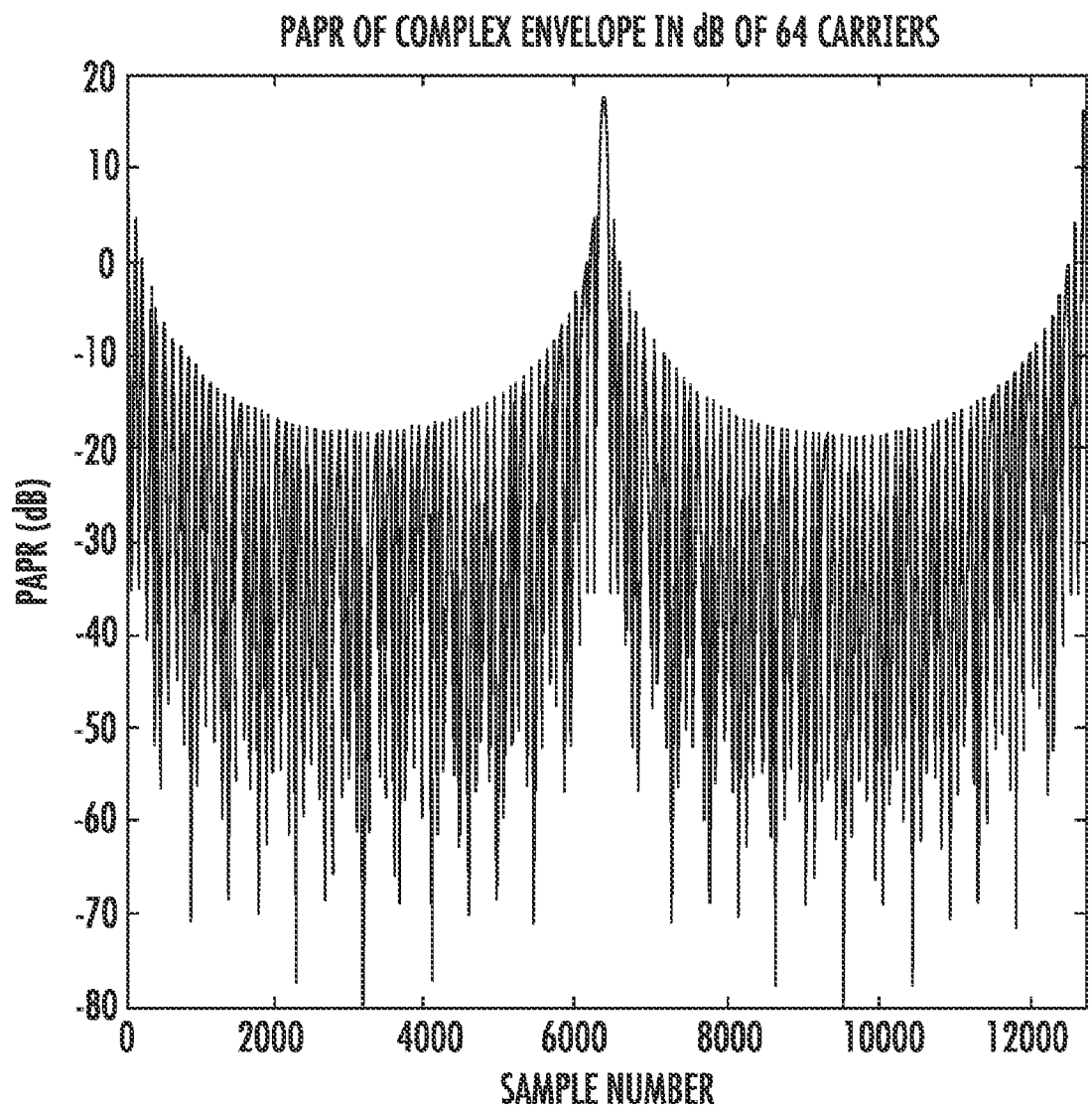
FIG. 11 is a graph showing the complex envelope of 64 carriers at zero-phase in dB (decibels) in an OFDM communications system.
Figure 12:
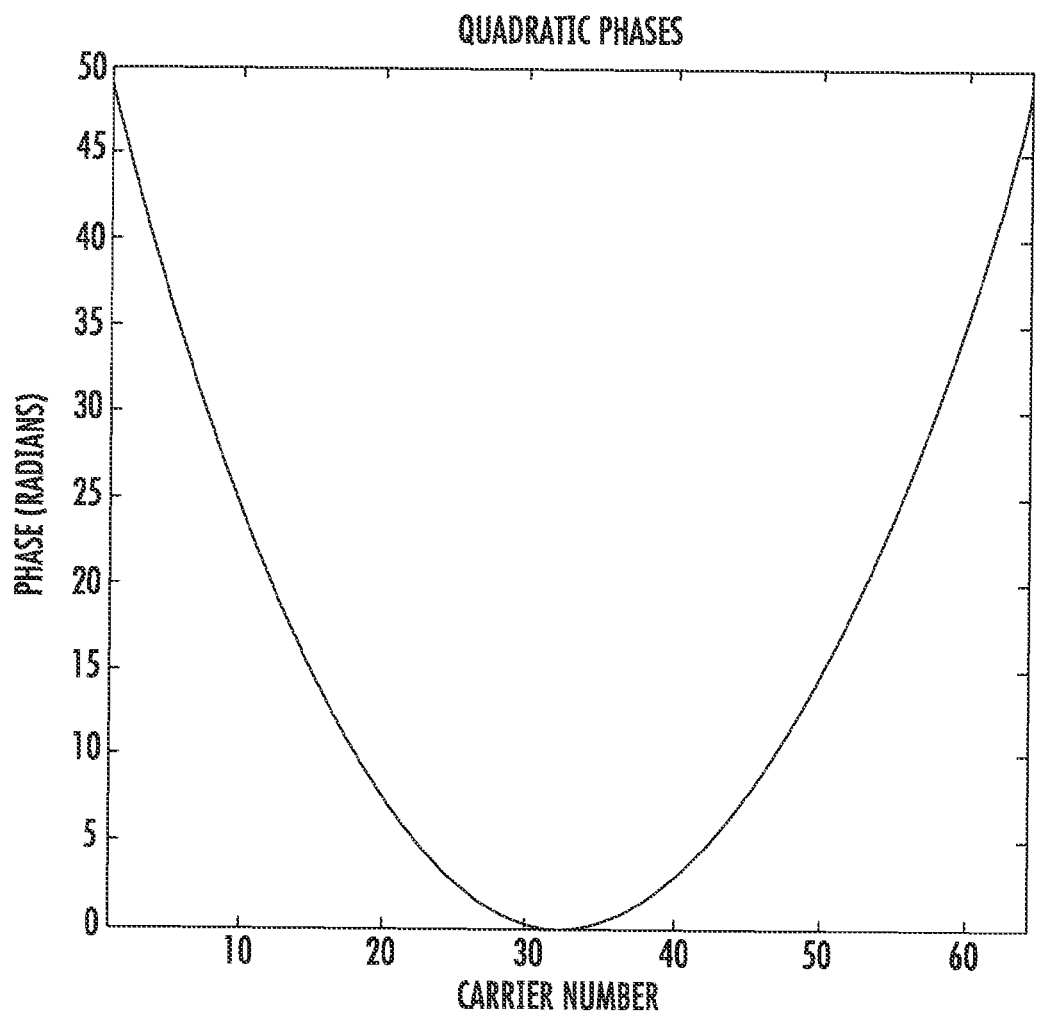
FIG. 12 is a graph showing the quadratic phases in an OFDM communications system such as for applying to the low PAPR preamble in accordance with non-limiting examples.

The 64-complex sinusoids for 64 carriers (zero-phase) were first summed together with identical phases, as shown in FIG. 10. FIG. 11 shows the complex envelope in log magnitude of the PAPR for 64 carriers (zero-phase) in dB. For the zero-phase case, a PAPR 18.061800 dB was measured in the simulation from the 64-sinusoids added in-phase. This compares identically to the theoretical PAPR of 64 sinusoids added in-phase 18.061800 dB. FIG. 12 shows the quadratic phases calculated using Equation 5 listed above.

The PAPR of 64-sinusoids summed together using quadratic phases was measured from simulation to be 2.600510 dB. This is very close to the predicted theoretical minimal PAPR of about 2.6 dB. The maximum PAPR location measured from the simulation occurred at 0.000391 seconds, which is close to the theoretical location of 0.000397 seconds predicted by Equation 6 listed above.

Figure 13:
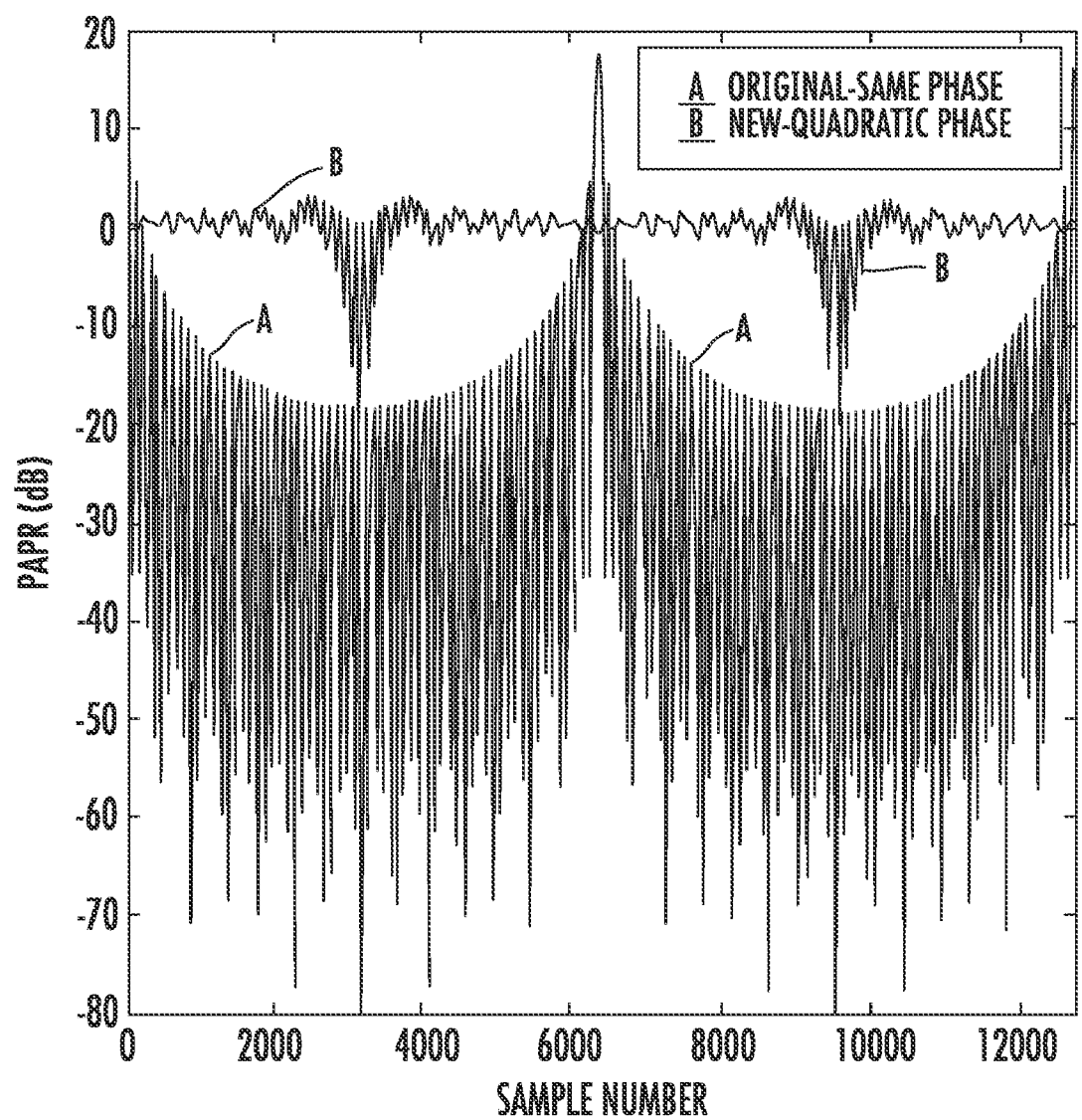
FIG. 13 is a graph showing the zero-phase versus the quadratic-phase PAPR (dB) in an OFDM communications system and showing an optimum quadrature phase for minimal PAPR.

FIG. 13 compares the PAPR of the complex sinusoids added together with identical phases for maximum PAPR and optimum quadratic phases for minimal PAPR. The maximum PAPR is approximately 18 dB on the identical-phase multi-carrier signal and approximately 2.6 dB on the quadratic phase multi-carrier signal as illustrated on the graphs.

Figure 14:
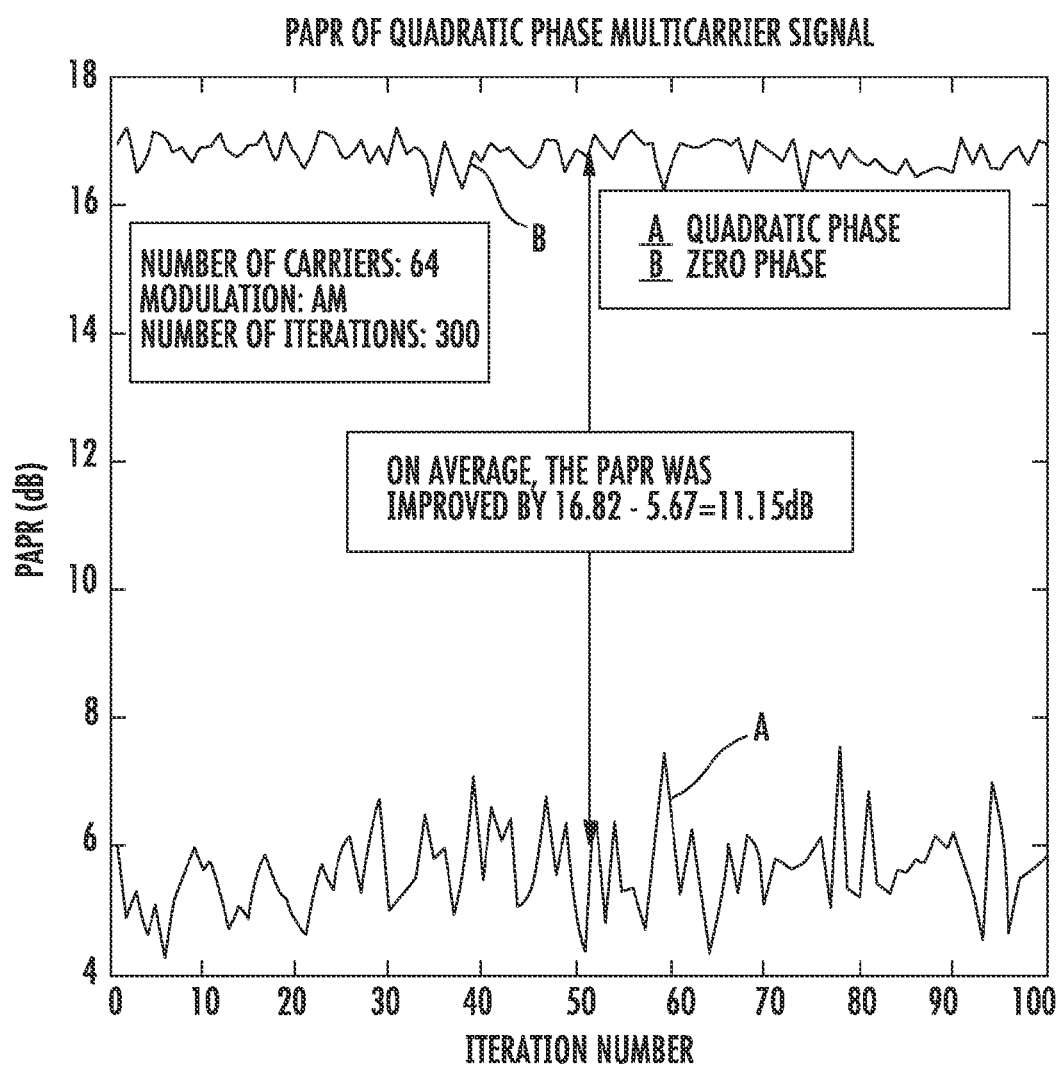
FIG. 14 is a graph showing the PAPR of AM modulated quadratic phase signals in an OFDM communications system.

Although the simulation was run with identical amplitudes for each carrier, the PAPR can still be reduced for other modulations schemes, such as AM, where the amplitude is not constant. FIG. 14 is a graph that illustrates using a random uniform amplitude distribution applied to each of the 64-carriers. Each carrier was independently AM modulated with a random amplitude value between 0 and 1. This simulation ran for 300 iterations, during which the PAPR statistics were collected for both the identically phased (zero-phase) carriers and the quadratic-phase carriers. This shows that on average, the PAPR was improved for the quadratic-phase case by 11.15 dB. It should be noted however, there was little to no improvement when random phase modulations were applied. This resulted because the quadratic phase relationship no longer holds for the phase-modulation case.

There now follows more details regarding the low PAPR preamble generation and processing and basic description for purposes of understanding. Digital communication systems using burst waveforms require channel estimation for each separate transmission. For such a packet waveform with short transmit durations, the channel impulse response is assumed to be stationary throughout. Typical data bursts therefore precede the payload data with training sequences to facilitate the channel estimation operation. An example training sequence (or preamble) is shown in FIG. 8. The short sync segments $t_1$-$t_{10}$ (262) differ from the long sync symbols $T_1$ and $T_2$ (264) (including the double guard interval GI2).

Figure 18:
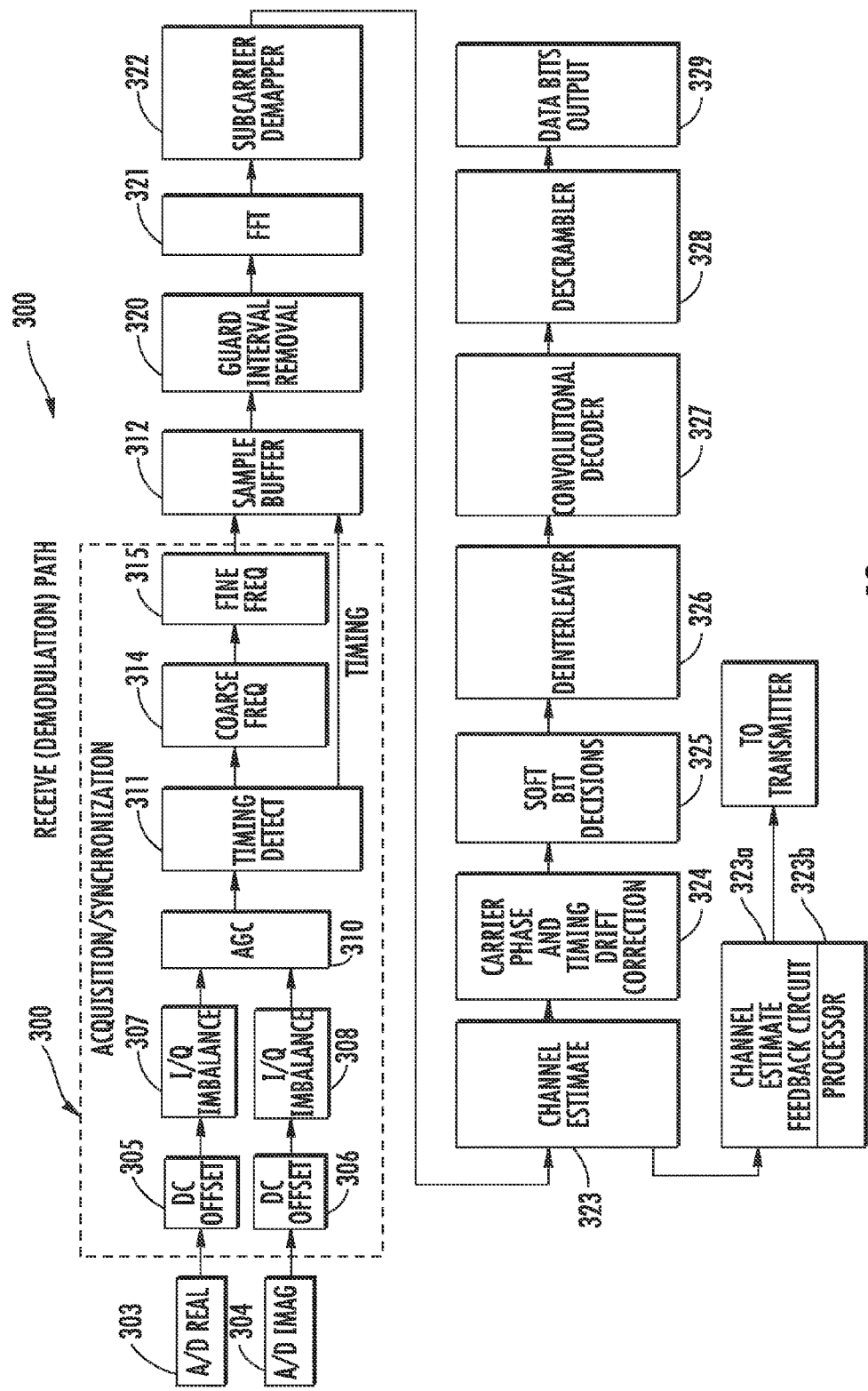
FIG. 18 is another block diagram of an OFDM receiver similar to that shown in FIG. 7 that can be used for processing the low PAPR preamble in accordance with a non-limiting example of the present invention and using a channel estimate circuit within the receiver circuitry.

The receiver, such as shown in FIG. 7 and also described relative to FIG. 18, uses the short sync symbols in the preamble to detect the arrival of the packet, recover the timing and perform coarse and fine frequency offset estimation (fine estimation is done using the long sync symbols). The received OFDM waveform is then converted to the frequency domain (using an FFT). Channel estimation and compensation is then performed using the long sync symbols 264 in the preamble. The pilot tones embedded in OFDM symbols are used to correct the common angular phase error and the sampling clock drift. Data rate and packet length of the received packet are determined using the SIGNAL field 266. This information is then used to demodulate, deinterleave, depuncture and decode the received information symbols.

The channel compensation function estimates the frequency response of the channel, which is later used to compensate the effects of the channel from the received packet, before the transmitted bits can be recovered.

One of the advantages of the OFDM communications system is that it is not necessary to use a complicated equalizer to compensate for fading and distortion caused by the channel. Instead of performing equalization in the time domain, an OFDM receiver typically compensates for the channel response in the frequency domain. This compensation usually requires much less computation. The low PAPR long sync preamble activates a variety of subcarriers (for example, 52 similar to IEEE 802.11a or possibly all 64 for proprietary solutions) with a known value during the long sync sequence. Channel estimation and correction can be modeled as (Equation 7):

$$Y_{Long,k} = H_k X_{Long,k} + W_k$$

where $X_{Long,k}$ is the known $k^{th}$ subcarrier signal of the long sync preamble; $Y_{Long,k}$ is the received $k^{th}$ subcarrier signal during the long sync preamble. $H_k$ is the channel frequency response on the $k^{th}$ subcarrier; and $W_k$ is AWGN noise on the $k^{th}$ subcarrier. The channel frequency response estimation on subcarrier k is given by (Equation 8):

$$\hat{H}_k = \frac{Y_{Long,k}}{X_{Long,k}}$$

Since the channel impulse response is assumed to remain stationary throughout a packet, channel estimation derived in the long sync preamble can be used to correct the data symbols that will follow in that same packet transmission. Such that (Equation 9):

$$\hat{Y}_{n,k} = \frac{Y_{n,k}}{H_k}$$

where $Y_{n,k}$ and $\hat{Y}_{n,k}$ are the signals at the receiver before and after channel correction, respectively.

Two received long sync symbols are combined and then compared to the known transmitted long sync symbol to estimate the complex channel coefficient for information carrying subcarriers as well as pilot subcarriers (Equation 10).

$$\hat{H}(k) = \frac{1}{2} \sum_{m=0}^{1} \frac{R^m(k)}{S^m_{long}(k)}$$

In the 64 subcarrier example, if the samples used to calculate measured $R^0(k)$ and $R^1(k)$ are consecutive in time (i.e. $T_1$ and $T_2$ from FIG. 8, respectively) then only a single reference is needed. This method implies that $S^0_{long}(k)$ and $S^1_{long}(k)$ are identical. In practical implementations, this is not the case. Therefore, the references $S^0_{long}(k)$ and $S^1_{long}(k)$ are different.

Instead, the double guard interval (GI2) as shown FIG. 8 is effectively split in half. The first 16 samples of GI2 make up a normal guard interval, then the last 16 samples of GI2 plus the first 48 samples of $T_1$ provide the 64 samples presented to the FFT for the measurement of $R^0(k)$. Continuing through the long sync sequence, the last 16 samples of $T_1$ make up a normal guard interval, then all 64 samples of $T_2$ are presented to the FFT for the measurement of $R^1(k)$.

Figure 15:
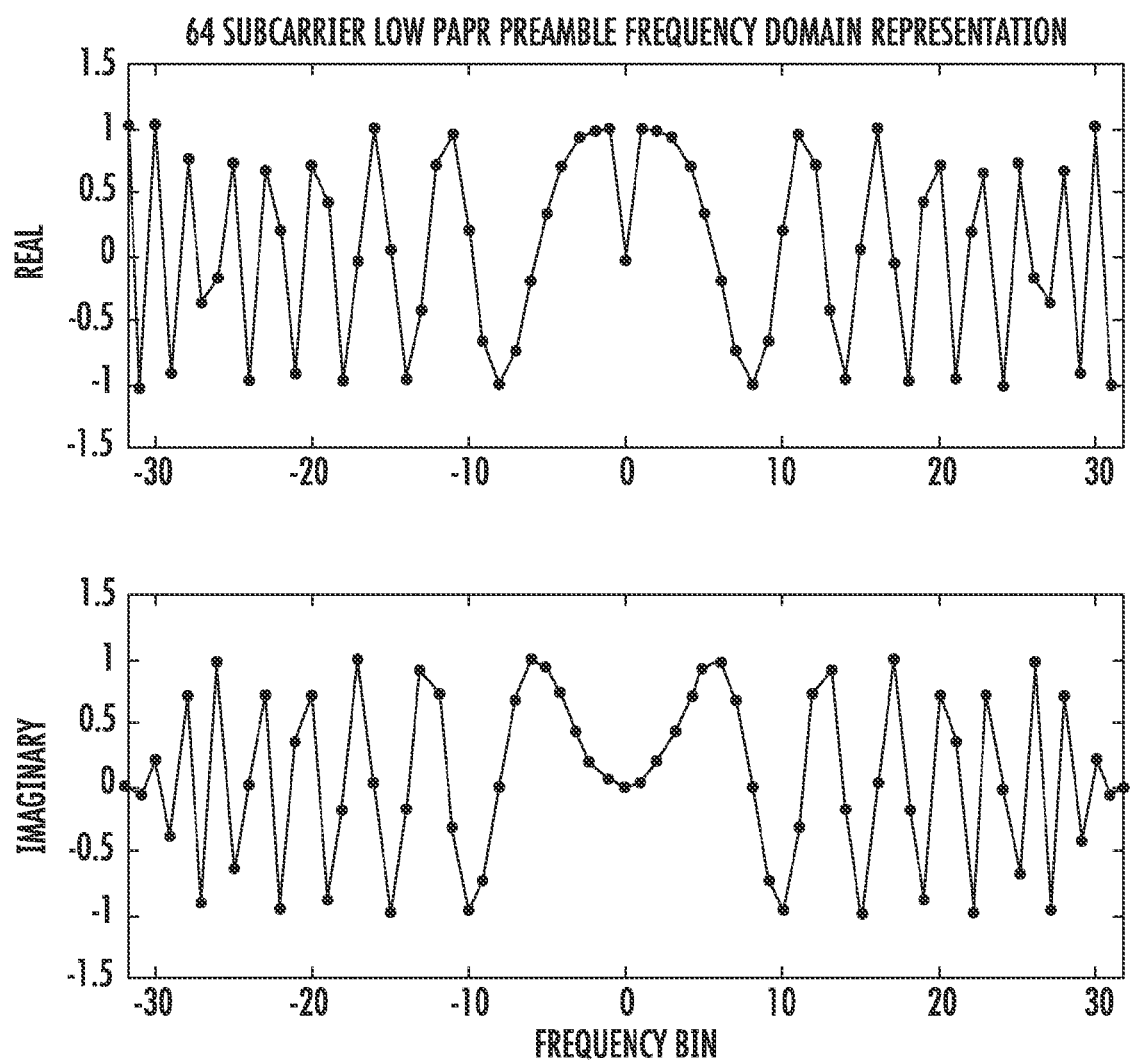
FIG. 15 are graphs for the real and imaginary signal representations of a low PAPR preamble frequency-domain representation in accordance with a non-limiting example of the present invention.

A division operation is typically not used in a practical hardware implementation. For that reason the $1/S^m_{long}(k)$ are replaced with a multiplication by their inverse. This requires that $S^0_{long}(k)$ and $S^1_{long}(k)$ be invertible, meaning no zero values. As an example, FIG. 15 shows a 64 subcarrier low PAPR preamble in the frequency domain.

Figure 16:
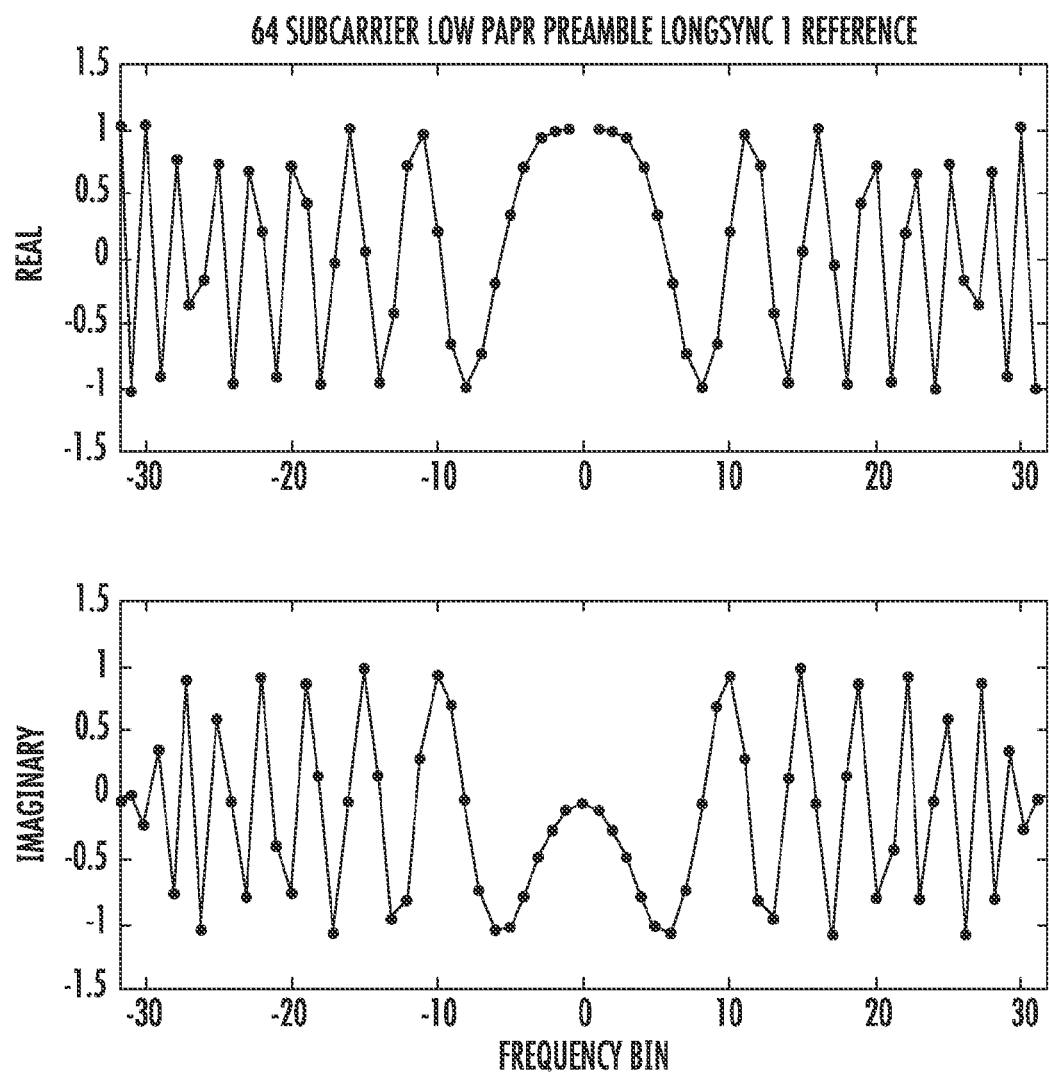
FIG. 16 are graphs for real and imaginary values for the low PAPR preamble long Sync 1 reference in accordance with a non-limiting example of the present invention.

The conjugate inversion of this will make the reference for $S^1_{long}(k)$ which is shown in FIG. 16 for the low PAPR preamble Long Sync 1 reference.

There is an invertible requirement and also in an attempt to simplify the mathematics, the formula for the channel estimate H(k) shown before can be modified. For example, the summation is removed and each individual contribution listed by itself (Equation 11).

$$\hat{H}(k) = 0.5 \cdot R^0(k)/S^0_{long}(k) + 0.5 \cdot R^1(k)/S^1_{long}(k)$$

Replacing the references $1/S^0_{long}(k)$ with $Z^0_{long}(k)$ and $1/S^1_{long}(k)$ with $Z^1_{long}(k)$, the division operations disappear. A multiply by 0.5 is implemented as a shift right operation and that can be left in place. The new equation is (Equation 12):

$$\hat{H}(k) = 0.5 \cdot R^0(k) \cdot Z^0_{long}(k) + 0.5 \cdot R^1(k) \cdot Z^1_{long}(k)$$

An additional factorization of the above equation for Equation 12 moves the 0.5 and $Z^1_{long}(k)$ outside the bracket (Equation 13).

$$\hat{H}(k) = 0.5 \cdot Z^1_{long}(k)[R^0(k) \cdot Z^0_{long}(k)/Z^1_{long}(k) + R^1(k)]$$

Therefore, an alternate calculation of the reference $V^0_{long}(k) = Z^0_{long}(k)/Z^1_{long}(k)$ which is done ahead of time reduces the formula to (Equation 13):

$$\hat{H}(k) = 0.5 \cdot Z^1_{long}(k)[R^0(k) \cdot V^0_{long}(k) + R^1(k)]$$

Figure 17:
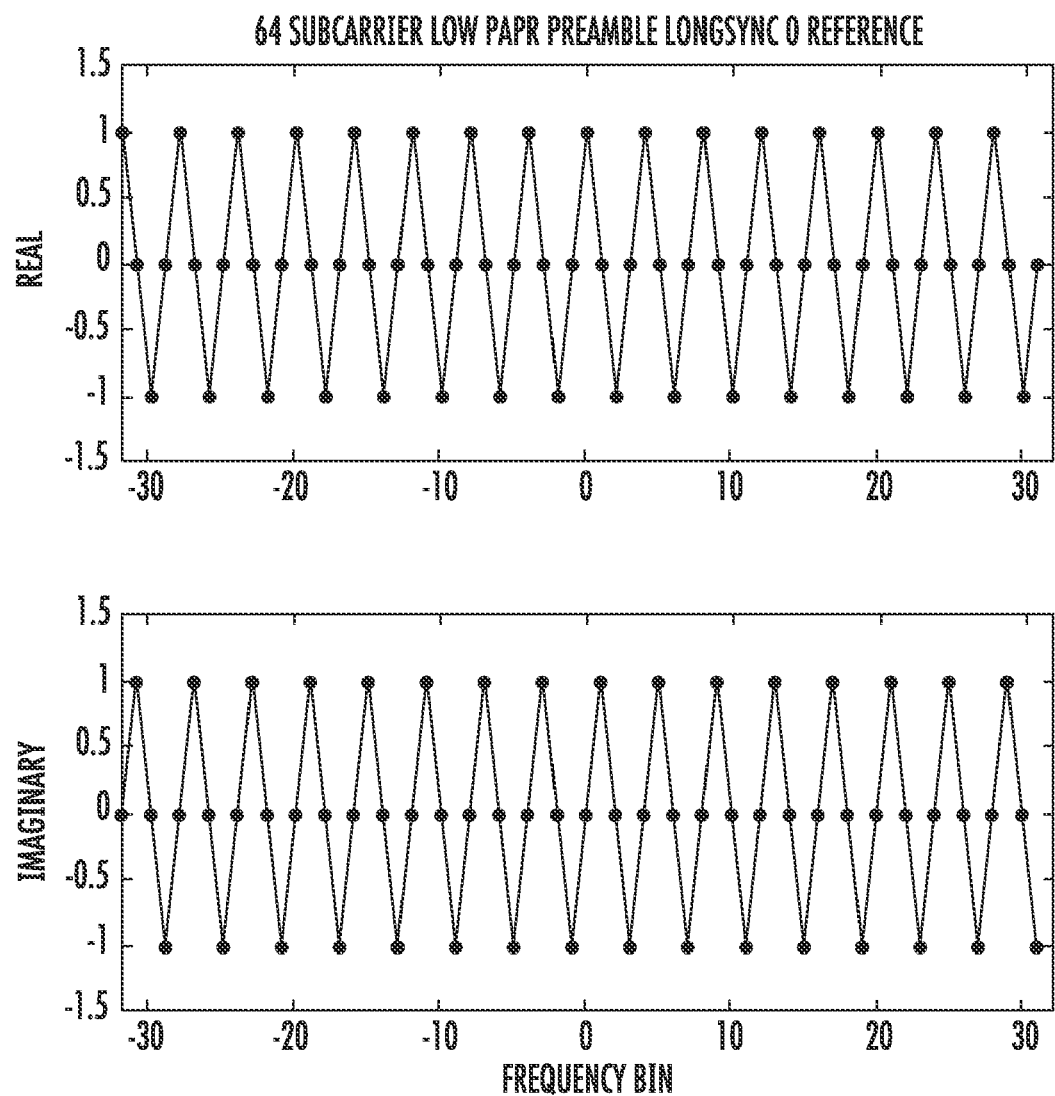
FIG. 17 are graphs for the real and imaginary values for the low PAPR preamble long Sync 0 reference in accordance with a non-limiting example of the present invention.

One of the advantages of this new intermediate reference value $V^0_{long}(k)$ is that its representation for the low PAPR preamble is just plus or minus one (±1) values in the real or imaginary component only. This is shown in the FIG. 17. These can easily be implemented as adds or subtracts of the specified component (real or imaginary) such as in a processor, FPGA or other device.

After completion of the one time per packet calculation needed for the channel estimate, the correction can be applied for each subsequent OFDM symbol in the transmission. By taking the samples of interest (splitting up the longer GI2) from the long sync sequence in a similar manner to the way the data symbols will be processed, the system can guarantee that the channel estimate is concurrent and aligned in frequency to the data symbol frequency domain representations. This includes any subcarrier reordering that might have been required for other aspects of the receiver implementation.

FIG. 18 illustrates an example receiver at 300 that takes advantage of the low PAPR preamble in accordance with a non-limiting example. It receives the OFDM communications signal that incorporates the low PAPR preamble and can perform enhanced channel monitoring. The receiver shown in FIG. 18 shows some similarity to the receiver shown in FIG. 7 and includes the channel estimator. The receiver 300 includes an acquisition/synchronization circuit shown at 302 that includes the inputs such as from the analog/digital converter 226 as shown in FIG. 7 with a real and imaginary signal path for the A/D real signal path 303 and A/D imaginary signal path 304. Each path includes a DC offset circuit 305, 306 and an in-phase/quadrature imbalance circuit 307, 308 for both the real and imaginary values. These are input into an automatic gain control (AGC) circuit 310 and into a timing detect circuit 311. The timing detect circuit 311 sends the timing value not only to the sample buffer 312 such as the data buffer 228 of FIG. 7, but also through a coarse frequency circuit 314 and fine frequency circuit 315 for the acquisition and synchronization as described before relative to the low PAPR preamble.

After the sample buffer that corresponds such as to the data buffer 228 of FIG. 7, further components receive the signal and correspond to many of the components of FIG. 7. Guard interval removal occurs at a guard interval removal circuit 320 followed by the FFT circuit 321 and subcarrier demapping at a subcarrier demapper circuit 322. The channel estimate circuit 323 corresponds such as to the channel estimator 237 shown in FIG. 7 and is followed by carrier phase and timing drift correction circuit 324 and soft bit decisions circuit 325. Deinterleaving occurs at circuit 326 followed by convolutional decoding in a convolutional decoder 327. The signal is descrambled and a descrambler circuit 328 followed by data bits output 329.

As illustrated, the channel estimate circuit is operative with a channel estimate feedback circuit 323a that can transmit back to the transmitter data regarding the communications channel, such as for turning OFF and ON selected subcarriers and other details as explained. This transmitter can include a processor 323b that controls the feedback and channel estimate calculations as well as operation of the channel estimate circuit 323.

The low PAPR preamble is advantageous because the PAPR of the signal is about 2.6 dB and independent of the number of subcarriers used. Typical OFDM systems transmit known training symbols during the preamble in order to allow the receiver to perform channel estimation. To simplify receiver implementation, an impulse can be transmitted over the channel in order to measure the channel's instantaneous impulse response. It is well-known that an impulse has a large time-domain peak. The frequency domain subcarriers will approach a time-domain impulse as the subcarriers are added together in-phase. Preferably, the known training symbols contain a sample of the channel at each subcarrier location. If each of the subcarriers are added in-phase, the result is a worst-case PAPR of 10 log(N), which is essentially an impulse. In accordance with a non-limiting example of the present invention, the system produces the desired impulse response of the channel while maintaining a low PAPR of about 2.6 dB, independent of the number of subcarriers.

Figure 18A:
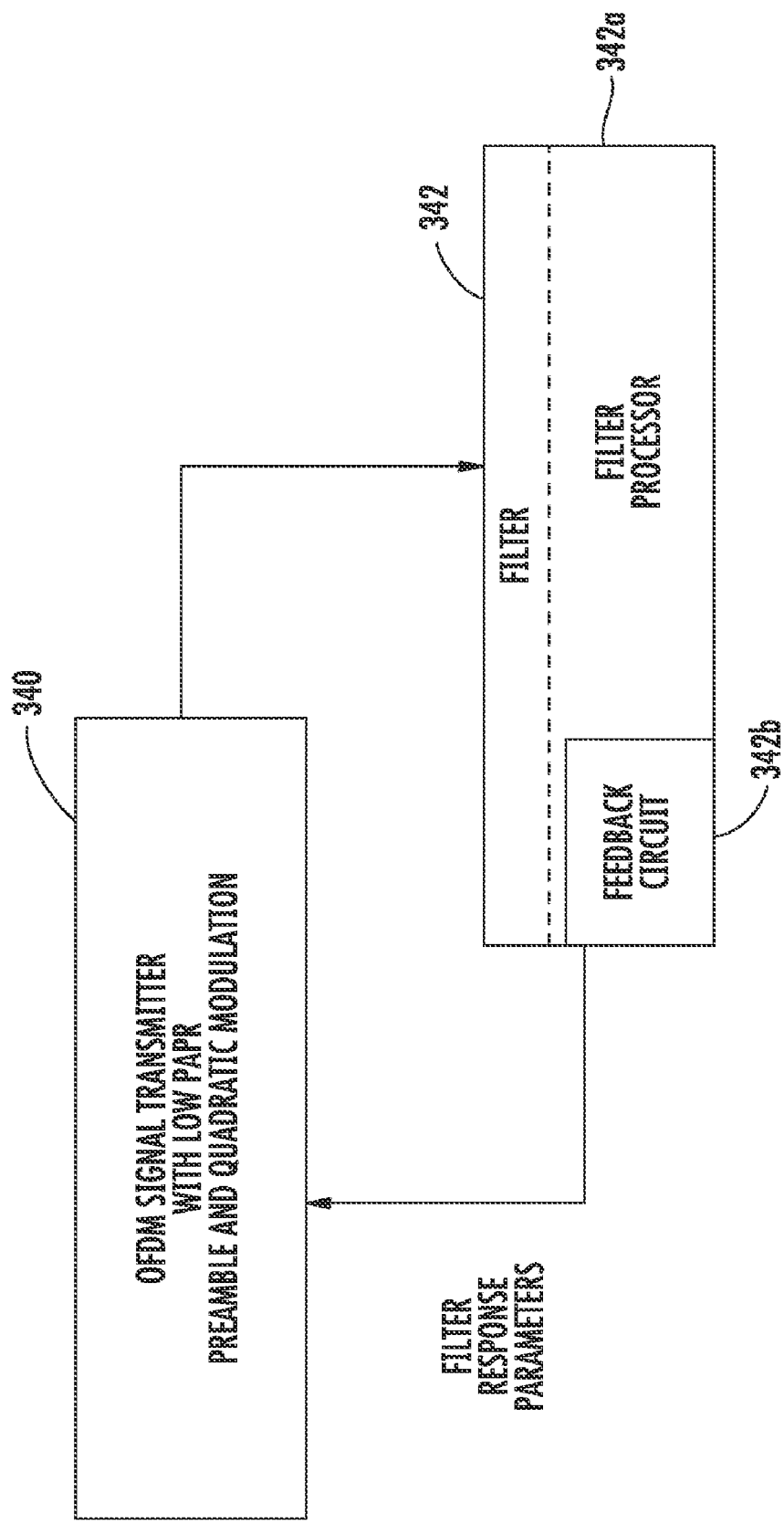
FIG. 18A is a block diagram showing an OFDM transmitter operative for transmitting an OFDM signal with low PAPR preamble to a filter for determining the filter response in accordance with a non-limiting example.

FIG. 18A shows a high-level block diagram of a signal generator as an OFDM transmitter 340 that transmits a signal with a low PAPR preamble that can be used for measuring the filter response of a filter 342, which can include an associated processor and measuring circuit 342a. The processor 342a can include an associated feedback circuit 342b for feeding information back to the transmitter. Alternatively, data can be fed back to the signal generator as the OFDM transmitter in this non-limiting example.

Figure 19:
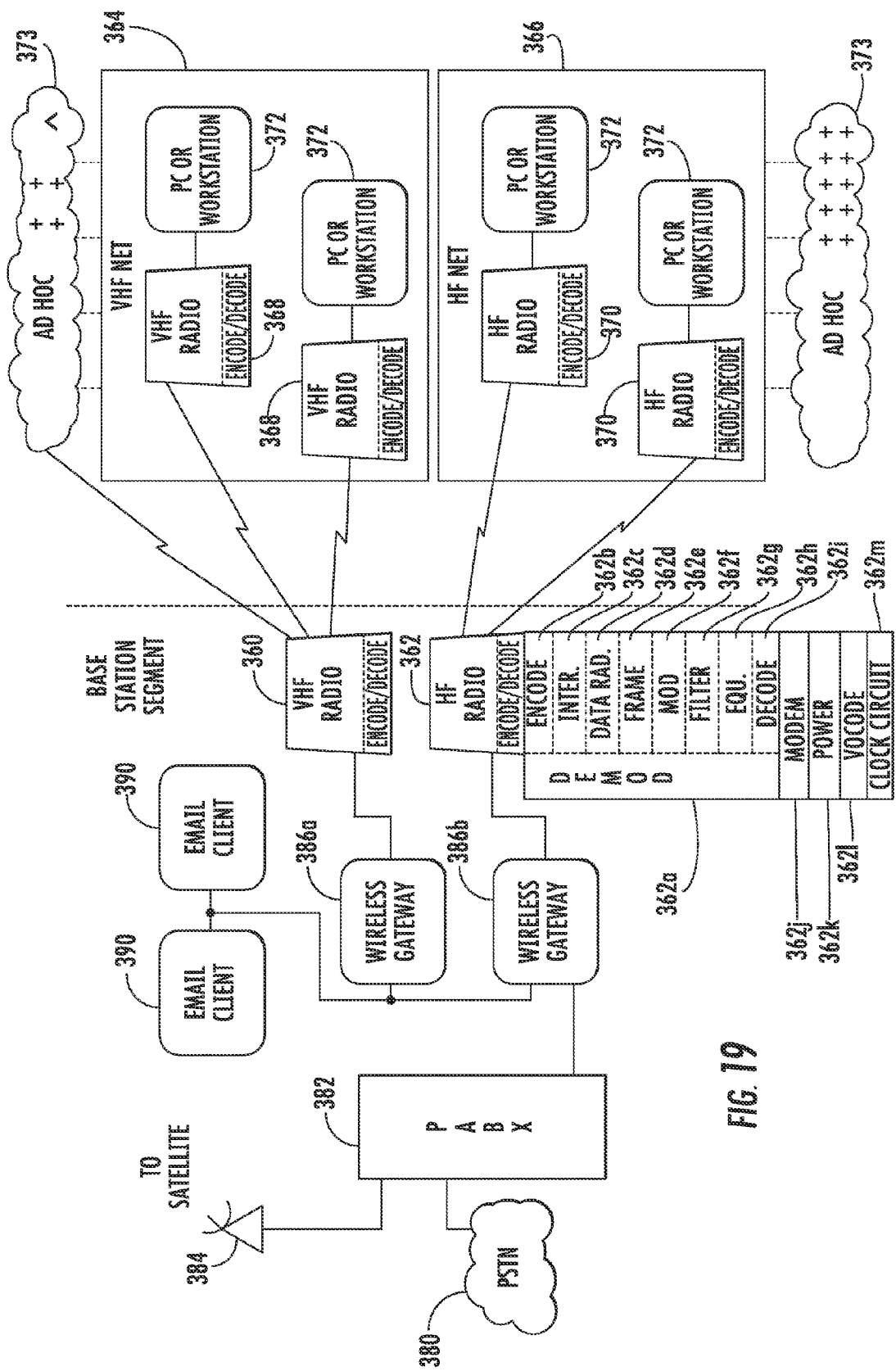
FIG. 19 is a block diagram of an example of a communications system with various communications devices that can be used and modified in accordance with a non-limiting example of the present invention.

For purposes of description, some further information on coding, interleaving, and an exemplary wireless, mobile radio communications system that includes ad-hoc capability and can be modified for use is set forth. This example of a communications system that can be used and modified in accordance with the present invention is now set forth with regard to FIGS. 19 and 20. FIG. 19 shows a number of radio devices that could be transmitters and receivers.

An example of a radio that could be used with such system and method is a Falcon™ III radio manufactured and sold by Harris Corporation of Melbourne, Fla. This type of radio can support multiple wavebands form 30 MHz up to 2 GHz, including L-band SATCOM and MANET. The waveforms can provide secure IP data networking. It should be understood that different radios can be used, including software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification (see www.jtrs.saalt.mil), which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

For purposes of description only, a brief description of an example of a communications system that includes communications devices that incorporate the phase and Doppler (frequency) tracking, in accordance with a non-limiting example, is described relative to a non-limiting example shown in FIG. 19. This high-level block diagram of a communications system includes a base station segment and wireless message terminals that could be modified for use with the present invention. The base station segment includes a VHF radio 360 and HF radio 362 that communicate and transmit voice or data over a wireless link to a VHF net 364 or HF net 366, each which include a number of respective VHF radios 368 and HF radios 370, and personal computer workstations 372 connected to the radios 368,370. Ad-hoc communication networks 373 are interoperative with the various components as illustrated. The entire network can be ad-hoc and include source, destination and neighboring mobile nodes. Thus, it should be understood that the HF or VHF networks include HF and VHF net segments that are infrastructure-less and operative as the ad-hoc communications network. Although UHF and higher frequency radios and net segments are not illustrated, these are included for DAMA and satellite operation.

The radio can include a demodulator circuit 362a and appropriate convolutional encoder circuit 362b, block interleaver 362c, data randomizer circuit 362d, data and framing circuit 362e, modulation circuit 362f, matched filter circuit 362g, block or symbol equalizer circuit 362h with an appropriate clamping device, deinterleaver and decoder circuit 362i modem 362j, and power adaptation circuit 362k as non-limiting examples. A vocoder circuit 362l can incorporate the decode and encode functions and a conversion unit could be a combination of the various circuits as described or a separate circuit. A clock circuit 362m can establish the physical clock time and through second order calculations as described below, a virtual clock time. The network can have an overall network clock time. These and other circuits operate to perform any functions necessary for the present invention, as well as other functions suggested by those skilled in the art. Other illustrated radios, including all VHF (or UHF) and higher frequency mobile radios and transmitting and receiving stations can have similar functional circuits. Radios could range from 30 MHz to about 2 GHz as non-limiting examples.

The base station segment includes a landline connection to a public switched telephone network (PSTN) 380, which connects to a PABX 382. A satellite interface 384, such as a satellite ground station, connects to the PABX 382, which connects to processors forming wireless gateways 386a, 386b. These interconnect to the UHF, VHF radio 360 or HF radio 362, respectively. The processors are connected through a local area network to the PABX 382 and e-mail clients 390. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance radio at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

Figure 20:
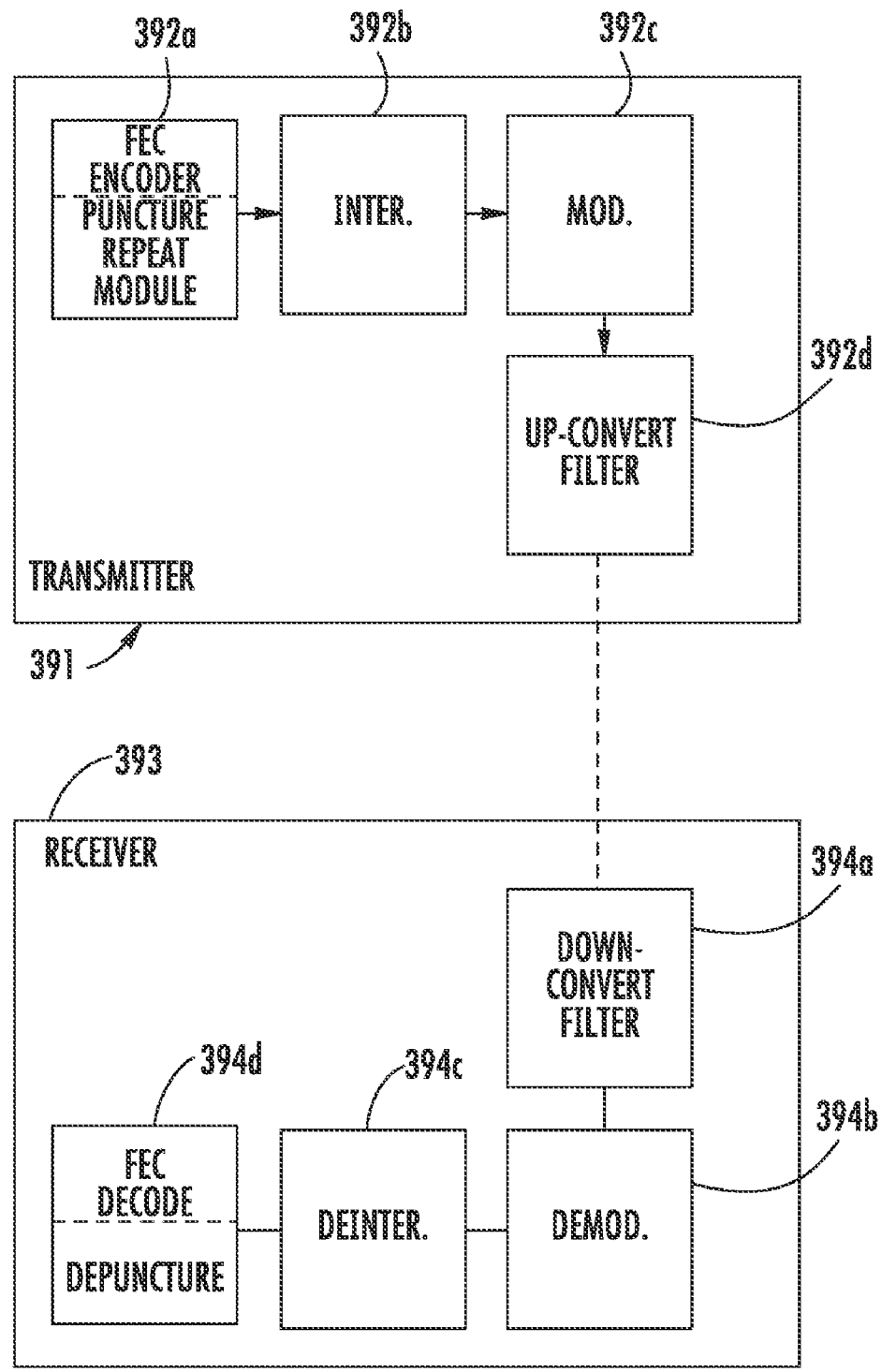
FIG. 20 is a high-level block diagram showing basic components of a transmitter and receiver used in communications devices that can be used and modified in accordance with a non-limiting example of the present invention.

A communications system that incorporates communications devices can be used in accordance with non-limiting examples of the present invention and is shown in FIG. 20. A transmitter is shown at 391 and includes basic functional circuit components or modules, including a forward error correction encoder 392a that includes a puncturing module, which could be integral to the encoder or a separate module. The decoder 392a and its puncturing module includes a function for repeating as will be explained below. Encoded data is interleaved at an interleaver 392b, for example, a block interleaver, and in many cases modulated at modulator 392c. This modulator can map the communications data into different symbols based on a specific mapping algorithm to form a communications signal. For example, it could form Minimum Shift Keying or Gaussian Minimum Shift Keying (MSK or GMSK) symbols. Other types of modulation could be used in accordance with non-limiting examples of the present invention. Up-conversion and filtering occurs at an up-converter and filter 392d, which could be formed as an integrated module or separate modules. Communications signals are transmitted, for example, wirelessly to receiver 393.

At the receiver 393, down conversion and filtering occurs at a down converter and filter 394a, which could be integrated or separate modules. The signal is demodulated at demodulator 394b and deinterleaved at deinterleaver 394c. The deinterleaved data (i.e., bit soft decisions) is decoded and depunctured (for punctured codes), combined (for repeated codes) and passed through (for standard codes) at decoder 394d, which could include a separate or integrated depuncturing module. The system, apparatus and method can use different modules and different functions. These components as described could typically be contained within one transceiver.

It should be understood, in one non-limiting aspect of the present invention, a rate 1/2, K=7 convolutional code can be used as an industry standard code for forward error correction (FEC) during encoding. For purposes of understanding, a more detailed description of basic components now follows. A convolutional code is an error-correcting code, and usually has three parameters (n, k, m) with n equal to the number of output bits, k equal to the number of input bits, and m equal to the number of memory registers, in one non-limiting example The quantity k/n could be called the code rate with this definition and is a measure of the efficiency of the code. K and n parameters can range from 1 to 8, m can range from 2 to 10, and the code rate can range from 1/8 to 7/8 in non-limiting examples. Sometimes convolutional code chips are specified by parameters (n, k, L) with L equal to the constraint length of the code as L=k (m−1). Thus, the constraint length can represent the number of bits in an encoder memory that would affect the generation of n output bits. Sometimes the letters may be switched depending on the definitions used.

The transformation of the encoded data is a function of the information symbols and the constraint length of the code. Single bit input codes can produce punctured codes that give different code rates. For example, when a rate 1/2 code is used, the transmission of a subset of the output bits of the encoder can convert the rate 1/2 code into a rate 2/3 code. Thus, one hardware circuit or module can produce codes of different rates. Punctured codes allow rates to be changed dynamically through software or hardware depending on channel conditions, such as rain or other channel impairing conditions.

An encoder for a convolutional code typically uses a lookup table for encoding, which usually includes an input bit as well as a number of previous input bits (known as the state of the encoder), the table value being the output bit or bits of the encoder. It is possible to view the encoder function as a state diagram, a tree diagram or a trellis diagram.

Decoding systems for convolutional codes can use 1) sequential decoding, or 2) maximum likelihood decoding, also referred to as Viterbi decoding, which typically is more desirable. Sequential decoding allows both forward and backward movement through the trellis. Viterbi decoding as maximum likelihood decoding examines a receive sequence of given length, computes a metric for each path, and makes a decision based on the metric.

Puncturing convolutional codes is a common practice in some systems and is used in accordance with non-limiting examples of the present invention. It should be understood that in some examples a punctured convolutional code is a higher rate code obtained by the periodic elimination of specific code bits from the output of a low rate encoder. Punctured convolutional code performance can be degraded compared with original codes, but typically the coding rate increases.

Some of the basic components that could be used as non-limiting examples of the present invention include a transmitter that incorporates a convolutional encoder, which encodes a sequence of binary input vectors to produce the sequence of binary output vectors and can be defined using a trellis structure. An interleaver, for example, a block interleaver, can permute the bits of the output vectors. The interleaved data would also be modulated at the transmitter (by mapping to transmit symbols) and transmitted. At a receiver, a demodulator demodulates the signal.

A block deinterleaver recovers the bits that were interleaved. A Viterbi decoder could decode the deinterleaved bit soft decisions to produce binary output data.

Often a Viterbi forward error correction module or core is used that would include a convolutional encoder and Viterbi decoder as part of a radio transceiver as described above. For example if the constraint length of the convolutional code is 7, the encoder and Viterbi decoder could support selectable code rates of 1/2, 2/3, 3/4, 4/5, 5/6, 6/7, 7/8 using industry standard puncturing algorithms, Different design and block systems parameters could include the constraint length as a number of input bits over which the convolutional code is computed, and a convolutional code rate as the ratio of the input to output bits for the convolutional encoder. The puncturing rate could include a ratio of input to output bits for the convolutional encoder using the puncturing process, for example, derived from a rate 1/2 code.

The Viterbi decoder parameters could include the convolutional code rate as a ratio of input to output bits for the convolutional encoder. The puncture rate could be the ratio of input to output bits for the convolutional encoder using a puncturing process and can be derived from a rate 1/2 mother code. The input bits could be the number of processing bits for the decoder. The Viterbi input width could be the width of input data (i.e. soft decisions) to the Viterbi decoder. A metric register length could be the width of registers storing the metrics. A trace back depth could be the length of path required by the Viterbi decoder to compute the most likely decoded bit value. The size of the memory storing the path metrics information for the decoding process could be the memory size. In some instances, a Viterbi decoder could include a First-In/First-Out (FIFO) buffer between depuncture and Viterbi function blocks or modules. The Viterbi output width could be the width of input data to the Viterbi decoder.

The encoder could include a puncturing block circuit or module as noted above. Usually a convolutional encoder may have a constraint length of 7 and take the form of a shift register with a number of elements, for example, 6. One bit can be input for each clock cycle. Thus, the output bits could be defined by a combination of shift register elements using a standard generator code and be concatenated to form an encoded output sequence. There could be a serial or parallel byte data interface at the input. The output width could be programmable depending on the punctured code rate of the application.

A Viterbi decoder in non-limiting examples could divide the input data stream into blocks, and estimate the most likely data sequence. Each decoded data sequence could be output in a burst. The input and calculations can be continuous and require four clock cycles for every two bits of data in one non-limiting example. An input FIFO can be dependent on a depuncture input data rate.

It should also be understood that the radio device is not limited to convolutional codes and similar FEC, but also turbo codes could be used as high-performance error correction codes or low-density parity-check codes that approach the Shannon limit as the theoretical limit of maximum information transfer rate over a noisy channel. Thus, some available bandwidth can be increased without increasing the power of the transmission. Instead of producing binary digits from the signal, the front-end of the decoder could be designed to produce a likelihood measure for each bit.

Figure 21:
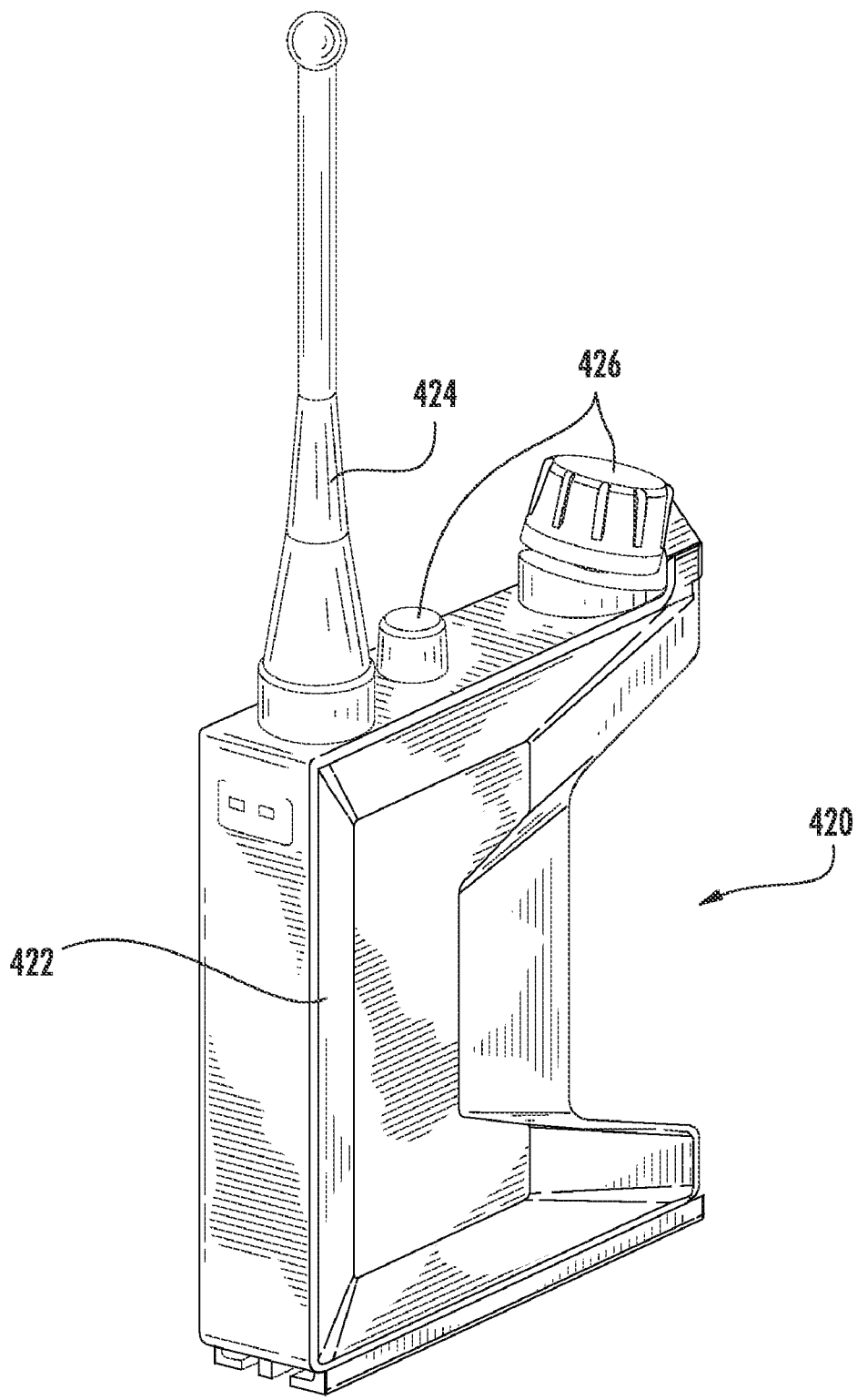
FIG. 21 is a perspective view of a portable wireless communications device as a handheld radio that could incorporate the communications system and radio as a communications device modified to work in accordance with a non-limiting example of the present invention.

The system, in accordance with non-limiting examples of the present invention, can be used in multiprocessor embedded systems and related methods and also used for any type of radio software communications architecture as used on mainframe computers or small computers, including laptops with an added transceiver, such as used by military and civilian applications, or in a portable wireless communications device 420 as illustrated in FIG. 21. The portable wireless communications device is illustrated as a radio that can include a transceiver as an internal component and handheld housing 422 with an antenna 424 and control knobs 426. A Liquid Crystal Display (LCD) or similar display can be positioned on the housing in an appropriate location for display. The various internal components, including dual processor systems for red and black subsystems and software that is conforming with SCA, is operative with the illustrated radio. Although a portable or handheld radio is disclosed, the architecture as described can be used with any processor system operative with the system in accordance with non-limiting examples of the present invention. An example of a communications device that could incorporate the communications system in accordance with non-limiting examples of the present invention, is the Falcon® III manpack or tactical radio platform manufactured by Harris Corporation of Melbourne, Fla.

This application is related to copending patent applications entitled, "LOW PEAK-TO-AVERAGE POWER RATIO (PAPR) PREAMBLE FOR ORTHOGONAL FREQUENCY DIVISION MULTIPLEXING (OFDM) COMMUNICATIONS" and "ORTHOGONAL FREQUENCY DIVISION MULTIPLEXING (OFDM) COMMUNICATIONS DEVICE AND METHOD THAT INCORPORATES LOW PAPR PREAMBLE AND RECEIVER CHANNEL ESTIMATE CIRCUIT," and "ORTHOGONAL FREQUENCY DIVISION MULTIPLEXING (OFDM) COMMUNICATIONS DEVICE AND METHOD THAT INCORPORATES LOW PAPR PREAMBLE AND FREQUENCY HOPPING," and "ORTHOGONAL FREQUENCY DIVISION MULTIPLEXING (OFDM) COMMUNICATIONS DEVICE AND METHOD THAT INCORPORATES LOW PAPR PREAMBLE WITH CIRCUIT FOR MEASURING FREQUENCY RESPONSE OF THE COMMUNICATIONS CHANNEL," which are filed on the same date and by the same assignee and inventors, the disclosures which are hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications device, comprising:
a source of communications data and a training sequence corresponding to a preamble;
a modulation and mapping circuit that modulates the communications data and training sequence into a plurality of variable subcarriers that are orthogonal to each other to form an Orthogonal Frequency Division Multiplexing (OFDM) communications signal having modulated subcarriers carrying the communications data forming a data payload and modulated subcarriers forming the preamble;
a circuit operating with the modulator and mapping circuit and configured to turn OFF and ON selected subcarriers pseudo-randomly based on an encryption algorithm to increase transmit power and signal-to-noise ratio per subcarrier and reduce the Inter-Carrier Interference (ICI); and
wherein said modulation and mapping circuit is configured to apply a quadratic modulation to each of the subcarriers carrying the training sequences and apply a specific phase angle to each sinuosoid forming the modulated subcarrier carrying the training sequence to produce a low peak-to-average power ratio (PAPR) preamble.

2. The communications device according to claim 1, and further comprising a circuit for spreading the selected ON subcarriers over the frequency domain to reduce average power for enhanced Low Probability of Interception/Low Probability of Detection (LPI/LPD) and allow for more transmit power within a spectral mask and reduce adverse effects of Frequency Selective Fading.

3. The communications device according to claim 1, and further comprising a pseudo-random sequence generator operative with the modulation and mapping circuit for generating pseudo-random signals to the modulation and mapping circuit based on an encryption algorithm for frequency hopping each subcarrier at an OFDM symbol rate.

4. The communications device according to claim 1, wherein said modulation and mapping circuit is operative for independently amplitude modulating each subcarrier carrying the data sequences.

5. The communications device according to claim 1, wherein the low PAPR preamble is independent of the number of subcarriers forming the OFDM communications signal.

6. The communications device according to claim 1, wherein said modulation and mapping circuit is operative for setting quadratic phases of sinusoids forming the subcarriers carrying the training sequences.

7. The communications device according to claim 6, wherein said modulation and mapping circuit is operative for setting the phases of the sinusoids to a specific angle.

8. The communications device according to claim 1, wherein the preamble includes a long sync sequence for channel and fine frequency offset estimation having a guard interval (GI).

9. The communications device according to claim 1, wherein said modulation and mapping circuit is operative for forming each of the subcarriers that carries the training sequences of the OFDM communications signal to have equal amplitude.

10. The communications device according to claim 1, wherein the PAPR preamble has a PAPR value of 2.6 dB.

11. A method of communicating data, comprising:
receiving communications data to be transmitted and a training sequence corresponding to a preamble;
generating an Orthogonal Frequency Division Multiplexing (OFDM) communications signal having modulated subcarriers carrying the communications data forming a data payload and subcarriers carrying the training sequences forming the preamble;
turning OFF and ON selected subcarriers pseudo-randomly based on an encryption algorithm to increase transmit power and signal-to-noise ratio per subcarrier and reduce the Inter-Carrier Interference (ICI);
applying quadratic phase modulation to each of the subcarriers carrying the training sequences at a specific phase angle to each sinusoid forming the modulated subcarriers carrying the training sequence to produce a low peak-to-average power ratio (PAPR) preamble; and
transmitting the OFDM communications signal along a communications channel to a receiver.

12. The method according to claim 11, which further comprises spreading the selected ON subcarriers over the frequency domain to reduce average power for enhanced Low Probability of Interception/Low Probability of Detection (LPI/LPD) and allow for more transmit power within a spectral mask and reduce adverse effects of Frequency Selective Fading.

13. The method according to claim 11, which further comprises generating pseudo-random signals to a modulation and mapping circuit based on an encryption algorithm for frequency hopping each subcarrier at an OFDM symbol rate.

14. The method according to claim 11, which further comprises equally spacing in frequency each of the subcarriers carrying the training sequences.

15. The method according to claim 11, which further comprises forming each of the subcarriers carrying the training sequences to have equal amplitude.

16. The method according to claim 11, which further comprises independently amplitude modulating each subcarrier carrying the data sequences.

17. The method according to claim 11, wherein the low PAPR preamble is independent of the number of subcarriers forming the OFDM communications signal.

18. The method according to claim 11, which further comprises measuring fluctuations within a flat-topped spectrum of the OFDM communications signal corresponding to the preamble to reflect the frequency response of the communications channel.

19. The method according to claim 11, which further comprises setting quadratic phases of sinusoids forming the subcarriers carrying the training sequences.

20. The method according to claim 19, which further comprises setting the phases of the sinusoids to a specific angle.

21. The method according to claim 11, which further comprises forming the PAPR preamble with a PAPR value of 2.6 dB.

22. A method of communicating data, comprising:
receiving communications data to be transmitted and a training sequence corresponding to a preamble;
generating within a modulation and mapping circuit an Orthogonal Frequency Division Multiplexing (OFDM) communications signal having modulated subcarriers carrying the communications data forming a data payload and subcarriers carrying training sequences forming the preamble, wherein the preamble includes a long sync sequence for channel and fine frequency offset estimation having a guard interval (GI);
turning OFF and ON selected subcarriers pseudo-randomly based on an encryption algorithm to increase transmit power and signal-to-noise ratio and reduce the Intercarrier Interference (ICI);
applying a quadratic phase modulation to each of the subcarriers carrying the training sequences at a specific phase angle to each sinusoid forming the modulated subcarriers carrying the training sequence to produce a low peak-to-average power ratio (PAPR); and
splitting the guard interval from the long sync sequence and processing into values that represent the inverse low PAPR preamble as plus or minus one (+/−1) values in a real or imaginary component as adds and subtracts for channel estimation.

23. The method according to claim 22, which further comprises spreading the selected ON subcarriers over the frequency domain to reduce average power for enhanced Low Probability of Interception/Low Probability of Detection (LPI/LPD) and allow for more transmit power within a spectral mask and reduce adverse effects of Frequency Selective Fading.

24. The method according to claim 22, which further comprises generating pseudo-random signals to the modulation and mapping circuit based on an encryption algorithm for frequency hopping each subcarrier at an OFDM symbol rate.

25. The method according to claim 22, which further comprises using the "n" samples of the guard interval as a normal GI and portions of the long sync sequence for Fast Fourier Transform (FFT) processing for channel estimation.

26. The method according to claim 22, which further comprises forming the PAPR preamble with a PAPR value of 2.6 dB.

* * * * *